(12) United States Patent
Sakurai

(10) Patent No.: US 12,300,186 B2
(45) Date of Patent: May 13, 2025

(54) DRIVING CONTROLLING DEVICE AND DRIVING CONTROLLING METHOD AS WELL AS INFORMATION PROCESSING SYSTEM

(71) Applicant: Sony Group Corporation, Tokyo (JP)

(72) Inventor: Hisao Sakurai, Saitama (JP)

(73) Assignee: Sony Group Corporation (JP)

( * ) Notice: Subject to any disclaimer, the term of this patent is extended or adjusted under 35 U.S.C. 154(b) by 0 days.

(21) Appl. No.: 18/278,703

(22) PCT Filed: Jan. 14, 2022

(86) PCT No.: PCT/JP2022/001099
§ 371 (c)(1),
(2) Date: Aug. 24, 2023

(87) PCT Pub. No.: WO2022/190621
PCT Pub. Date: Sep. 15, 2022

(65) Prior Publication Data
US 2024/0135889 A1 Apr. 25, 2024
US 2024/0233658 A9 Jul. 11, 2024

(30) Foreign Application Priority Data
Mar. 8, 2021 (JP) .................. 2021-036354

(51) Int. Cl.
G09G 3/34 (2006.01)
G09G 3/36 (2006.01)
(52) U.S. Cl.
CPC ............. *G09G 3/3426* (2013.01); *G09G 3/36* (2013.01); *G09G 2300/026* (2013.01);
(Continued)

(58) Field of Classification Search
CPC .. G09G 3/3426; G09G 3/36; G09G 2320/064; G09G 2320/0673;
(Continued)

(56) References Cited

U.S. PATENT DOCUMENTS

| | | | |
|---|---|---|---|
| 10,201,049 B1* | 2/2019 | Xie | H05B 45/48 |
| 2007/0132674 A1* | 6/2007 | Tsuge | G09G 3/2074 345/77 |

(Continued)

FOREIGN PATENT DOCUMENTS

| | | | |
|---|---|---|---|
| JP | 2000056727 A | 2/2000 | |
| JP | 2001188513 A | 7/2001 | |

(Continued)

OTHER PUBLICATIONS

International Search Report for Application No. PCT/JP2022/001099 mailed Mar. 22, 22, pp. 3.

*Primary Examiner* — Benyam Ketema
(74) *Attorney, Agent, or Firm* — Lerner David LLP

(57) ABSTRACT

The present disclosure relates to a driving controlling device and a driving controlling method as well as an information processing system by which a display (backlight) with a high luminance and a high gradation can be implemented inexpensively and easily.

Light emission of an LED is controlled by control of a current value of current for energizing the LED in addition to control of energization time for energizing the LED with current, to control the light emission luminance of the LED. The present disclosure can be applied to a large-sized video wall in which multiple display units having an HDR function are arranged in tile-like arrangement, an LED backlight of an LCD display, and so forth.

20 Claims, 16 Drawing Sheets

(52) U.S. Cl.
CPC . *G09G 2310/067* (2013.01); *G09G 2320/064* (2013.01); *G09G 2320/0673* (2013.01); *G09G 2340/0428* (2013.01)

(58) Field of Classification Search
CPC ....... G09G 2300/026; G09G 2310/067; G09G 2340/0428; G09G 3/2014; G09G 3/3266; G09G 3/3275; G09G 3/3216; G09G 3/32; G09G 3/34; H05B 45/10; H05B 45/44; H05B 47/18; H05B 47/165; Y02B 20/40; H04N 5/66
See application file for complete search history.

(56) References Cited

U.S. PATENT DOCUMENTS

| | | | |
|---|---|---|---|
| 2007/0291198 A1* | 12/2007 | Shen | G09G 3/3413 349/69 |
| 2012/0188293 A1 | 7/2012 | Furukawa | |
| 2014/0111559 A1* | 4/2014 | Yang | G09G 3/2088 345/690 |
| 2016/0284283 A1* | 9/2016 | Kurita | G09G 3/2081 |
| 2018/0144715 A1 | 5/2018 | Shigeta | |
| 2018/0182279 A1* | 6/2018 | Sakariya | G09G 3/2088 |
| 2018/0247586 A1* | 8/2018 | Vahid Far | G09G 3/3216 |
| 2019/0035351 A1* | 1/2019 | Pyun | G09G 3/3688 |
| 2020/0394953 A1* | 12/2020 | Kim | G09G 3/32 |
| 2021/0398498 A1* | 12/2021 | Kim | G09G 5/10 |
| 2021/0398499 A1* | 12/2021 | Kim | G09G 3/36 |
| 2024/0233658 A9* | 7/2024 | Sakurai | G09G 3/36 |

FOREIGN PATENT DOCUMENTS

| | | |
|---|---|---|
| JP | 2005300990 A | 10/2005 |
| JP | 2019102184 A | 6/2019 |
| JP | 2020183998 A | 11/2020 |

* cited by examiner

DRIVING CONTROLLING DEVICE AND DRIVING CONTROLLING METHOD AS WELL AS INFORMATION PROCESSING SYSTEM

CROSS-REFERENCE TO RELATED APPLICATIONS

This application is a national phase entry under 35 U.S.C. § 371 of International Application No. PCT/JP2022/001099 filed Jan. 14, 2022, which claims the priority from Japanese Patent Application No. 2021-036354 filed in the Japanese Patent Office on Mar. 8, 2021, the entire contents of which are hereby incorporated by reference.

TECHNICAL FIELD

The present disclosure relates to a driving controlling device and a driving controlling method as well as an information processing system, and particularly to a driving controlling device and a driving controlling method as well as an information processing system by which a display (backlight) with a high luminance and a high gradation can be implemented inexpensively and easily.

BACKGROUND ART

As a conventional driving controlling method for a direct view type LED (Light Emitting Diode) display or for LEDs used in a backlight of an LCD (Liquid Crystal Display), mainly two controlling methods described below are available.

The first controlling method is a PWM (Pulse Width Modulation) controlling method of modulating light emission time while a current value is fixed, and the second controlling method is a PAM (Pulse current Amplitude Modulation) controlling method of modulating current to be supplied to LEDs while light emission time is kept fixed.

The PWM controlling method is frequently adopted mainly in a large-sized LED display device (LED display), and the PAM controlling method is frequently adopted mainly in an OLED (Organic Light Emitting Diode).

In recent years, since a video signal is progressed from that of an SDR (Standard Dynamic Range) type to that of an HDR (High Dynamic Range) type, a wide luminance dynamic range for a video is demanded, and particularly a maximum luminance of 1000 cd/m$^2$ or more is demanded.

In regard to such demands as just described, according to the PWM controlling method, driving current for an LED is not changed after being set once in initial setting. This is because a wavelength of light emitted from an LED has a property that it varies according to the current value, and, considering this, light emission wavelength variation of the LED according to a change of the current value is suppressed by normally controlling the driving current for an LED to a fixed current value and performing luminance control using the PWM controlling method.

Further, since the circuit scale is large in the PWM controlling method in general, a circuit configured as an IC (Integrated Circuit) is mounted on a surface opposite to a display surface of a pixel substrate on which LEDs are provided.

In luminance control of an LED by the PWM controlling method, in a case where a light emission luminance gradation is digitalized, the accuracy of the gradation control depends upon the increment (Bit accuracy).

In recent years, there is a demand for a very high luminance in a direct view type LED display and a backlight of an LCD, and a display in which a luminance controlling region is large is insufficient in regard to the accuracy in reproduction of a minimum width in luminance control on the low-luminance gradation side in some cases.

For example, in a case where the maximum luminance is set to 10000 cd/m$^2$ in 16-bit gradation, at the lowest luminance (at the 1st Step although it is black at Off), the luminance is 0.153 cd/m$^2$, and the luminance and chromaticity reproducibility in a low luminance region are insufficient.

Although a simple solution is to increase the Bit accuracy and besides set LED current with which a high luminance (for example: 10000 cd/m$^2$) can be obtained from the beginning, it is necessary that the LED to be used be of a type compatible with high current, and this increases the cost if it is taken into consideration that increase of the LED size is supposed.

Further, in the case of the PWM controlling method, it is necessary also for a driving system, a wiring resistance, a power supply, and so forth to have a large reserve capacity with a current value taken into consideration, and also this arises many demerits such as increase in cost and increase of unnecessary heat generation.

Therefore, there has been proposed a technology in which a concern that the LED current value may decrease in a low-luminance gradation in control only by the PAM controlling method and the luminance controlling dispersion of an LED may increase is avoided by a combination with the PWM controlling method to improve the gradation representation in a low-luminance region (refer to PTL 1).

CITATION LIST

Patent Literature

[PTL 1]
Japanese Patent Laid-Open No. 2000-056727

SUMMARY

Technical Problems

However, the technology disclosed in PTL 1 adopts a method of passing maximum luminance current in high-luminance region reproduction.

Therefore, as in a case in which the PWM controlling method described above is adopted, it is necessary also for a driving system, a wiring resistance, a power supply, and so forth to have a large reserve capacity with a current value taken into consideration, and there is a possibility that the cost may increase and unnecessary heat generation may increase.

The present disclosure has been made in view of such a situation as described above and makes it possible to implement a high-luminance and high-gradation display (backlight) inexpensively and easily.

Solution to Problems

The driving controlling device according to a first aspect of the present disclosure is a driving controlling device including an energization time controlling section that controls energization time for energizing an LED (Light Emitting Diode) with current to control a light emission luminance of the LED, and a current value controlling section that controls a current value of the current for energizing the LED, to control the light emission luminance of the LED.

The driving controlling method according to the first aspect of the present disclosure is a driving controlling method for a driving controlling device that includes an energization time controlling section and a current value controlling section, the driving controlling method including controlling, by the energization time controlling section, energization time for energizing an LED (Light Emitting Diode) with current, to control a light emission luminance of the LED, and controlling, by the current value controlling section, a current value of the current for energizing the LED, to control the light emission luminance of the LED.

In the first aspect of the present disclosure, the energization time for energizing the LED (Light Emitting diode) with current is controlled to control the light emission luminance of the LED, and the current value of the current for energizing the LED is controlled to control the light emission luminance of the LED.

The information processing system according to a second aspect of the present disclosure is an information processing system including a display section including a display unit having LEDs (Light Emitting Diodes) arranged in an array and a driving controlling device that controls driving of the LEDs, and a distribution section that accepts an input of a video signal, performs a predetermined signal process for the video signal, and distributes the resulting video signal to the display unit. The driving controlling device includes an energization time controlling section that controls energization time for energizing the LEDs with current, to control light emission luminances of the LEDs, and a current value controlling section that controls a current value of the current for energizing the LEDs, to control the light emission luminances of the LEDs.

In the second aspect of the present disclosure, an input of a video signal is accepted and the predetermined signal process is performed for the video signal, and the resulting video signal is distributed to the display unit having the driving controlling device for controlling driving of the LEDs (Light Emitting Diodes) arranged in the array. Then, the energization time for energizing the LEDs with current is controlled to control the light emission luminances of the LEDs, and besides the current value of the current for energizing the LEDs is controlled to control the light emission luminances of the LEDs.

DESCRIPTION OF EMBODIMENT

In the following, a preferred embodiment of the present disclosure is described in detail with reference to the accompanying drawings. It is to be noted that components having substantially the same functional configurations are denoted by the same reference signs in the present specification, and overlapping description of them is omitted.

In the following description, a mode for carrying out the present technology is described. The description is given in the following order.

1. Preferred Embodiment
2. Example of Practical Use

1. Preferred Embodiment

<Example of Configuration of Display System>

The present disclosure makes it possible to implement a display (backlight) of a high luminance and high gradation accuracy inexpensively and easily.

Figure 1:
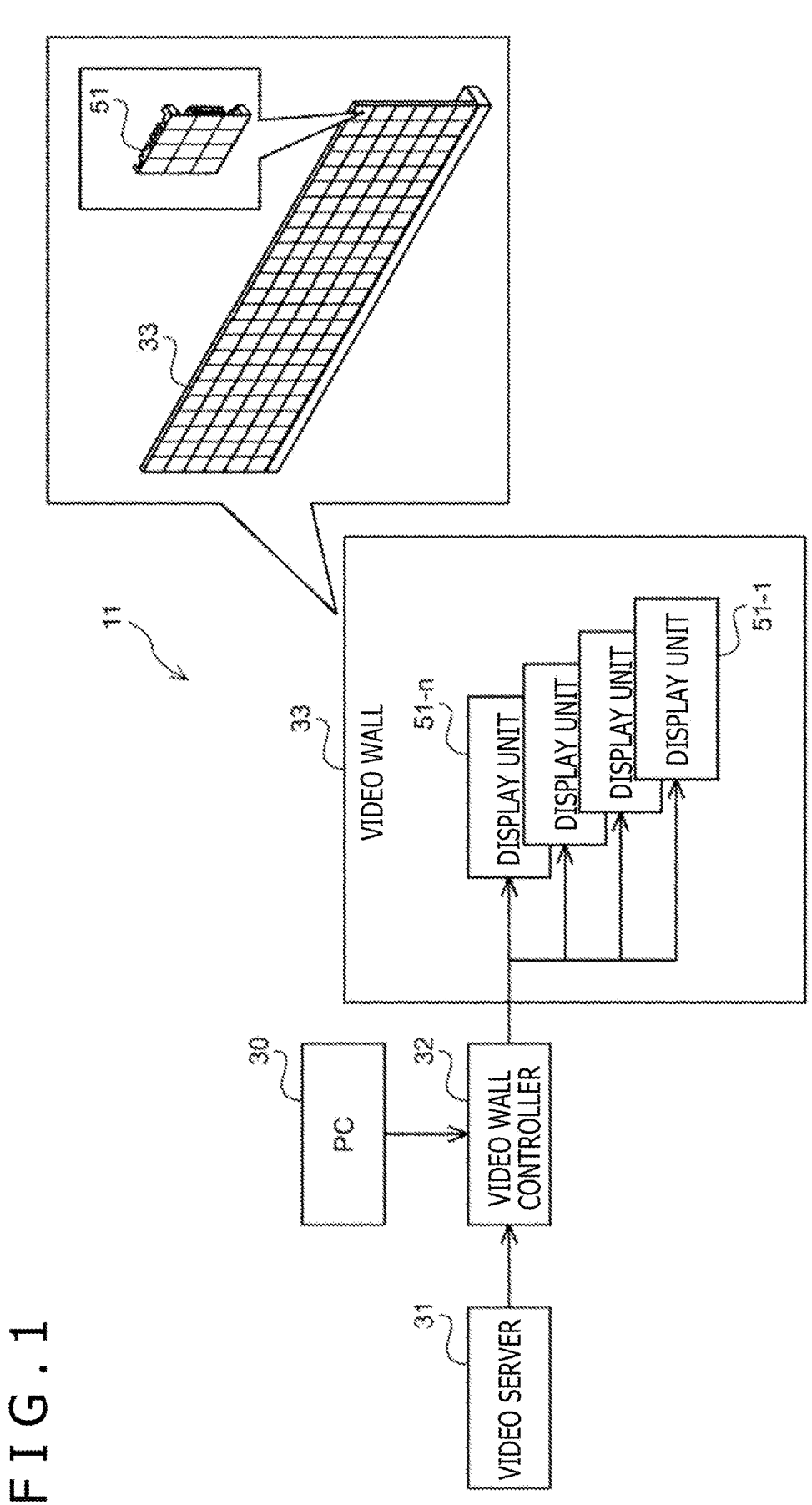
FIG. 1 is a view illustrating an example of a configuration of a display system of the present disclosure.

FIG. 1 depicts an example of a configuration of a display system to which the technology of the present disclosure is applied.

A display system 11 of FIG. 1 displays a video content on a large-sized display configured such that multiple display units are arranged in tile-like arrangement.

More particularly, the display system 11 includes a PC (personal computer) 30, a video server 31, a video wall controller 32, and a video wall 33.

The PC (personal computer) 30 is a general computer for universal use, and accepts an operation input of a user and supplies a command according to contents of the operation to the video wall controller 32.

The video server 31 includes, for example, a server computer or the like and supplies data of a video signal of a video content or the like to the video wall controller 32.

The video wall controller 32 acts in accordance with a command supplied thereto from the PC 30 and distributes data including a video signal of a video content to display units 51-1 to 51-n that configure the video wall 33, such that the data is displayed by the display units 51-1 to 51-n.

It is to be noted that, in a case where there is no necessity to individually distinguish the display units 51-1 to 51-n from each other, each of them is referred to simply as a display unit 51.

In the video wall 33, the display units 51-1 to 51-n in which pixels including LEDs are arranged in an array are arranged in tile-like arrangement as depicted at an upper right portion of FIG. 1. Images displayed on the individual display units 51 are combined into tile-like arrangement such that a single image is displayed as a whole on the video wall 33.

The video wall controller 32 performs a predetermined signal process for data including a video signal of a video content supplied from the video server 31 and distributes and supplies the data according to the arrangement of the display units 51-1 to 51-$n$ such that displaying by the individual display units 51-1 to 51-$n$ is controlled to control the video wall 33 to display a single image as a whole.

It is to be noted that the video wall controller 32 and the video wall 33 may be in an integrated configuration or may be a display device (information processing device) in which they are integrated with each other.

<Detailed Configuration of Video Wall Controller and Display Unit>

Now, an example of a detailed configuration of the video wall controller 32 and the display unit 51 is described with reference to FIG. 2.

The video wall controller 32 includes a LAN (Local Area Network) terminal 71, an HDMI (registered trademark) (High Definition Multimedia Interface) terminal 72, a DP (Display port) terminal 73, a DVI (Digital Visual Interface) terminal 74, a network IF (Interface) 75, an MPU (Micro Processor Unit) 76, a signal input IF 77, a signal processing section 78, a DRAM (Dynamic Random Access Memory) 79, a signal distribution section 80, and output IFs 81-1 to 81-$n$.

The LAN (Local Area Network) terminal 71 is a connection terminal, for example, for a LAN cable or the like, and is operated by the user and implements communication, with the PC 30 (PC) through a LAN, for supplying a control command or the like according to contents of the operation to the video wall controller 32, and a control command or the like inputted thereto is supplied to the MPU 76 via the network IF 75.

It is to be noted that the LAN terminal 71 may have such a configuration that a wired LAN cable is physically connected thereto or may be configured by what is generally called a wireless LAN implemented by wireless communication.

The MPU 76 accepts an input of a control command supplied thereto from the PC 30 via the LAN terminal 71 and the network IF 75 and supplies a control signal according to the accepted control command to the signal processing section 76.

The HDMI terminal 72, the DP terminal 73, and the DVI terminal 74 are input terminals of data all including video signals and are connected, for example, to a server computer that functions as the video server 31, such that data including video signals are accepted via the signal input IF 77 by the signal processing section 78.

Figure 2:
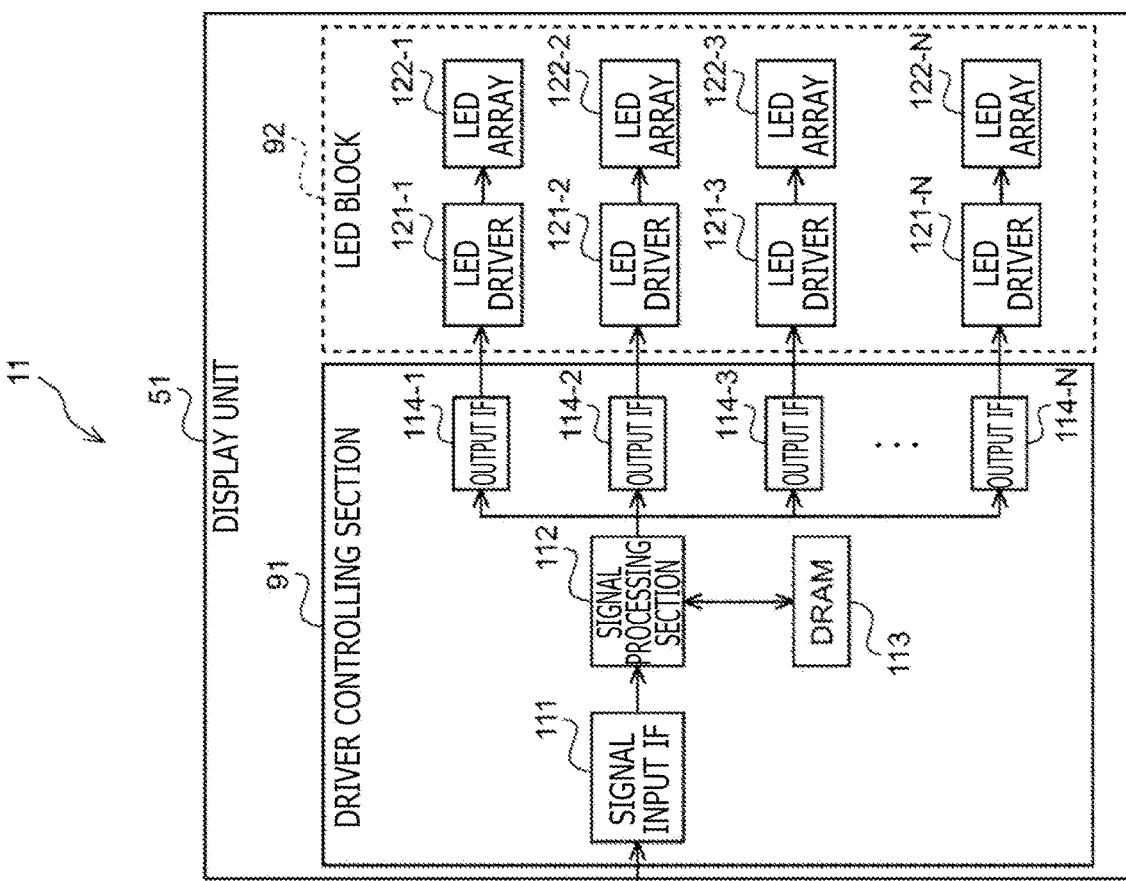
FIG. 2 is a view illustrating an example of a configuration of a video wall controller and a display unit in FIG. 1.

It is to be noted that, although FIG. 2 depicts an example in which the video server 31 and the HDMI terminal 72 are connected to each other, the HDMI terminal 72, the DP terminal 73, and the DVI terminal 74 basically have similar functions except that they are different only in standards from each other, and therefore, any one of them is selected and connected as occasion demands.

The signal processing section 78 adjusts a color temperature, contrast, brightness, or the like of data including a video signal supplied through the signal input IF 77, on the basis of a control signal supplied from the MPU 76, and supplies resulting data to the signal distribution section 80. At this time, the signal processing section 78 develops the data including a video signal, by using the DRAM 78 connected thereto, as occasion demands, executes a signal process based on the control signal, and supplies a result of the signal process to the signal distribution section 80.

The signal distribution section 80 distributes data that is supplied thereto from the signal processing section 78 and that includes a video signal for which a signal process has been performed, and distributes and transmits the data individually to the display units 51-1 to 51-$n$ via the output IFs 81-1 to 81-$n$, respectively.

The display unit 51 includes a driver controlling section 91 and an LED block 92.

The driver controlling section 91 supplies data including a video signal for controlling emission of light of the LEDs configuring LED arrays 122-1 to 122-N to multiple LED drivers 121-1 to 121-N configuring the LED block 92.

More particularly, the driver controlling section 91 includes a signal input IF 111, a signal processing section 112, a DRAM 113, and output IFs 114-1 to 114-N.

The signal input IF 111 accepts an input of data of a video signal supplied from the video wall controller 32 and supplies the inputted data to the signal processing section 112.

The signal processing section 112 performs correction of a color and a luminance for each of the display units 51 on the basis of data of a video signal supplied from the signal input IF 111, to generate data for setting a light emission intensity for each of the LEDs configuring the LED arrays 122-1 to 122-N, and distributes and supplies the data to the LED drivers 121-1 to 121-N of the LED block 92 via the output IFs 114-1 to 114-N, respectively.

The LED block 92 includes the LED drivers 121-1 to 121-N and the LED arrays 122-1 to 122-N.

The LED drivers 121-1 to 121-N control, on the basis of data that includes a video signal supplied from the driver controlling section 91 and that is used to set the light emission intensity for each LED 141, emission of light of the LEDs that are arranged in an array and that configure the corresponding LED arrays 122-1 to 122-N.

<Example of Configuration of LED Array>

Figure 3:
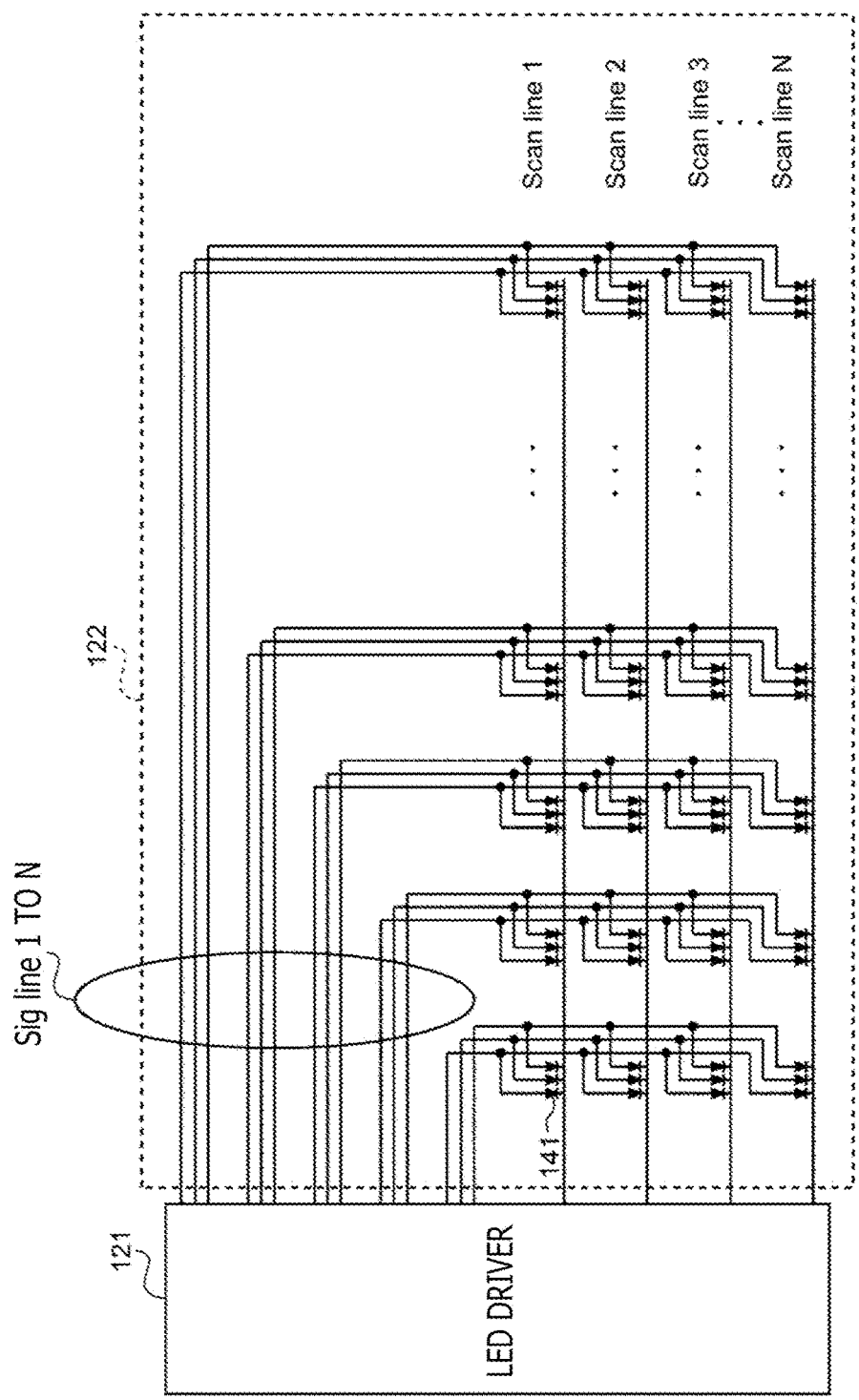
FIG. 3 is a diagram illustrating an example of a configuration of an LED array.

Now, an example of a configuration of the LED array 122 is described with reference to FIG. 3. FIG. 3 depicts an example of a configuration of the LED array 122 of a passive matrix driven type LED driving connection scheme.

In the LED array 122 of FIG. 3, the LEDs 141 of the Common Cathode type are arranged in an array and are connected to Sig lines (luminance controlling lines) wired in a vertical direction and Scan lines (row selection lines) wired in a horizontal direction along which the LEDs 141 are arranged.

In the LED array 122 of FIG. 3, if the Scan line 1 is turned ON by being set to a predetermined fixed potential, then current is supplied to the LEDs from the Sig Line, and the LEDs perform a light emission action. It is to be noted that, although the predetermined fixed potential is typically GND=0 V potential, this is not restrictive.

<Driving Method for LED Array>

Now, a driving method for the LED array 122 of FIG. 3 is described. In a case where the LED array 122 of FIG. 3 is controlled by the PWM controlling method, the light emission intensity is controlled by control of the energization time of a predetermined current value of current for energizing the LED 141. On the other hand, in a case where the LED array 122 of FIG. 3 is controlled by the PAM controlling method, the current value of current for energizing the LED 141 is controlled by control of the light emission intensity of the LED 141.

In the LED array 122 of FIG. 3, a change of Sig line control values (energization time or current values) for the individual sequential Scan lines from the Scan line 1 to the Scan line N changes the light emission intensities of the LEDs 141 arranged in a matrix, so that such display that is recognized as a video image as a whole is performed.

Further, switching of the Scan line is performed as multiple cyclic actions in a Frame interval (for example, 60 Hz) such that the resulting video image may not become unsightly.

Figure 4:
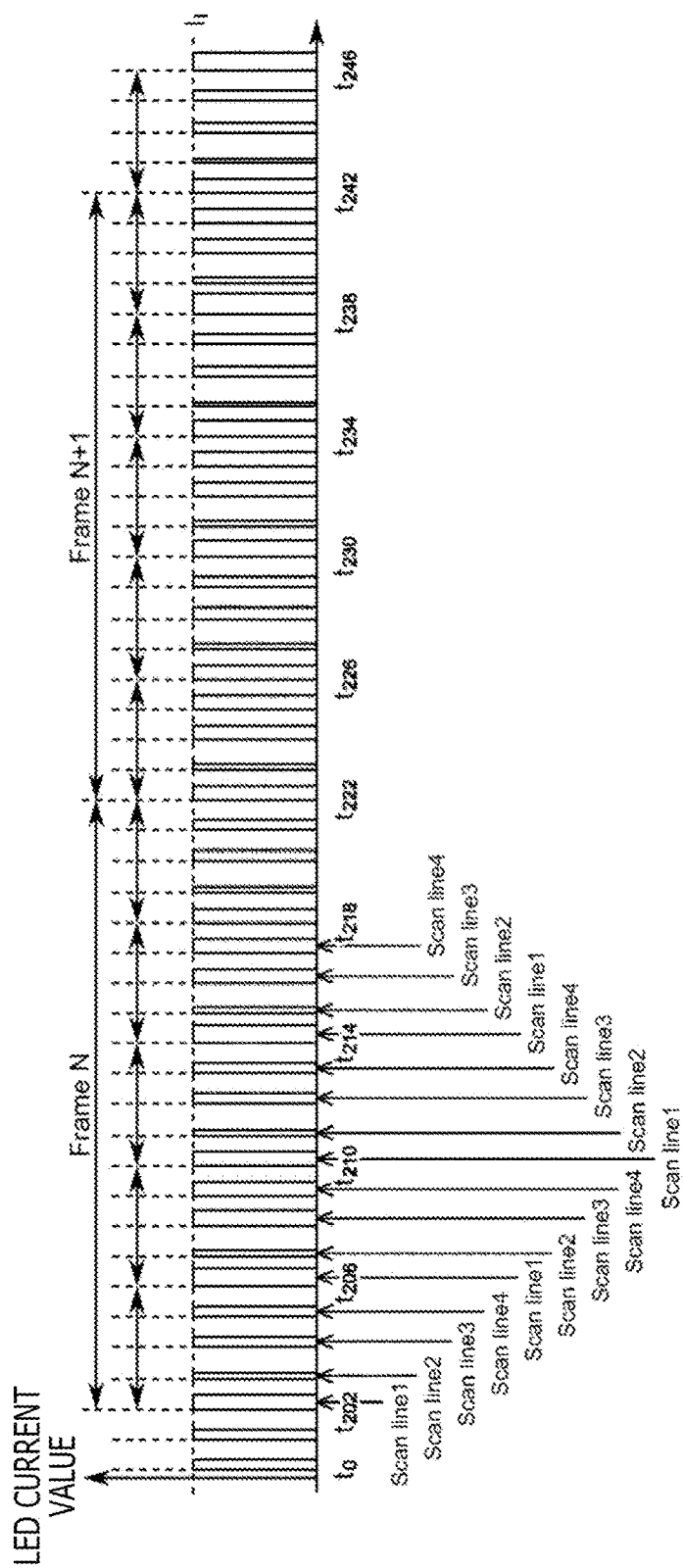
FIG. 4 is a diagram illustrating a driving method for the LED array.

In particular, in a case where driving is controlled by the PWM controlling method and N of the Scan lines 1 to N is 4, light emission is controlled, for example, in such a manner as depicted in FIG. 4. In particular, by energizing the LEDs 141 in an order of the Scan line 1 to the Scan line 4 with a reference current value Ii with the energization time changed for each frame interval of 60 Hz as depicted in FIG. 4, an action for causing the LEDs 141 to emit light with brightness according to the energization time is repeated by five times. The reference current value Ii here is a current value that is made a reference in selection or design of various components that configure the display system 11, such as the LEDs 141, driving systems, wiring resistances, and a power supply, for example.

In a case of FIG. 4, each LED 141 performs blinking light emission in a cycle of 300 (=60 Hz×5 times) Hz. Consequently, flickering when the LEDs 141 are visually observed by a person is reduced.

However, in a case where the PWM controlling method depicted in FIG. 4 is used for control, the current value of current for energizing the LED 141 is fixed to the current value Ii that is made an initial value. If it is assumed that it is made possible to change the current value, then although the current value is changed irrespective of the light emission timing. In order to change the current value according to a high luminance request, it is necessary to change the current value to a value corresponding to the luminance.

Therefore, the LED driver 121 that controls driving of the LED array 122 of the present disclosure is configured such that, to the control of the PWM (including PDM: Pulse Density Modulation (a signal strength is represented by a generation density (total amount) of pulses with the pulse width fixed)), driving current control of controlling the current value of current for energizing the LED 141 in synchronism with a light emission timing is added. By this, the LED 141 is energized with a current value corresponding to a light emission timing corresponding to a luminance only for energization time suitable for the luminance, so that light emission appropriately corresponding especially to a high luminance request is implemented.

<Example of Configuration of LED Driver>

Figure 5:
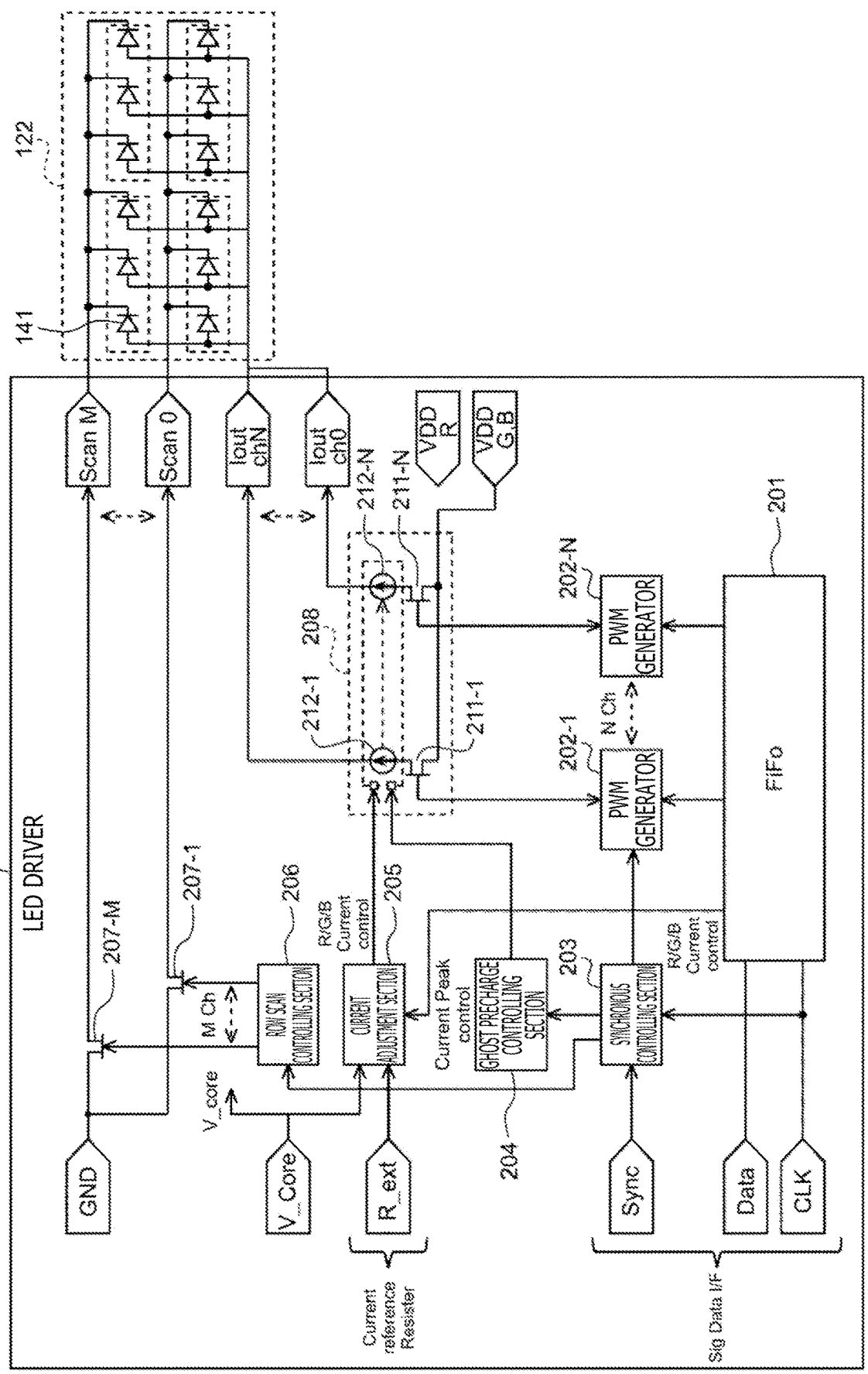
FIG. 5 is a view illustrating an example of a configuration of an LED driver.

Now, an example of a configuration of the LED driver 121 of the present disclosure is described with reference to FIG. 5.

The LED driver 121 includes a FiFo 201, PWM generators 202-1 to 202-N, a synchronous controlling section 203, a ghost precharge controlling section 204, a current adjustment section 205, a row scan controlling section 206, switch transistors 207-1 to 207-M, and a constant current source block 208.

The FiFo (First In First Out) 201 acquires data (Data) for setting a light emission intensity of the LED 141 supplied thereto via a luminance controlling signal interface (Sig data I/F), temporarily stores the data as luminance setting data, and then outputs the data to the PWM generators 202-1 to 202-N on the basis of a clock signal (CLK).

The luminance setting data that is data (Data) for setting a light emission intensity of the LED 141 is data including, for example, 18 bits, and in the data, the upper 2 bits are data for controlling the current value that is adjusted by the current adjustment section 205, and the remaining 16 bits are data for controlling the energization time of current controlled by the PWM generator 202.

It is to be noted that the number of bits of the luminance setting data that is data (Data) for setting a light emission intensity of the LED 141 is not restricted to 18 bits, and also the number of bits for controlling the current value and the number of bits for controlling the energization time of current may be other bit numbers.

The PWM generators 202-1 to 202-N control, individually for channels 1 to N that correspond to the columns of the array of the LEDs 141, on or off of switch transistors 211-1 to 211-N in the constant current source block 208 on the basis of a synchronizing signal supplied from the synchronous controlling section 203 and on the basis of luminance setting data which is data (Data) for setting a light emission intensity and which is supplied from the FiFo 201, to thereby control on or off of respective current sources 212-1 to 212-N.

In short, on or off of the current sources 212-1 to 212-N is controlled by the PWM generators 202-1 to 202-N, respectively, to control the time for which the LEDs 141 are energized, and as a result, the light emission intensity (luminance) is controlled.

The synchronous controlling section 203 supplies, on the basis of a synchronizing signal (Sync) supplied via a luminance controlling signal interface (Sig data I/F), a synchronizing signal to the PWM generators 202-1 to 202-N, the ghost precharge controlling section 204, and the row scan controlling section 206 to control synchronism of them.

The ghost precharge controlling section 204 controls energization from the constant current sources 212-1 to 212-N to pre-charge the LEDs 141 or controls discharge for suppressing a ghost. In particular, there is a case in which the LEDs 141 cannot emit light, for example, with a minimum width of PWM due to an influence of a junction capacitance that the LEDs 141 each have or an influence of a parasitic capacitance generated in wires on a board on which the LEDs 141 are mounted or, conversely, a case in which emission of light continues due to a parasitic capacitance. Therefore, as a countermeasure for such cases as just described, the ghost precharge controlling section 204 controls energization from the constant current sources 212-1 to 212-N to pre-charge (compulsorily charge) or discharge the LEDs 141.

The current adjustment section 205 sets current values (R/G/B Current control) for energization from the current sources 212-1 to 212-N in the current source block 208 in synchronism with, on the basis of luminance setting data that is data (Data) stored in the FiFo 201, a timing at which current controlled by the PWM generator 202 is used for energization.

More particularly, the luminance setting data that is data (Data) stored in the FiFo 201 is luminance setting information for each LED 141 based on a video signal, and includes information regarding a timing at which the LED 141 is to be energized with current (information regarding energization time) and information regarding a current value used for energization of the LED.

The luminance setting data may include data of, for example, 18 bits, among which the upper 2 bits represent information for setting a current value and the remaining 16 bits represent information indicating a timing at which the LED 141 is to be energized with current.

In this case, the current adjustment section 205 may set the current value such that it is switched, on the basis of data for controlling the current value of the upper 2 bits of the luminance setting data that is data (Data) stored in the FiFo 201, among three different current values including the current value Ii that is used as a reference, a current value Iu higher by a predetermined value than the reference current value Ii, and a current value Id lower by a predetermined value than the reference current value Ii.

Meanwhile, the PWM generators 202-1 to 202-N control on or off of the current sources 212-1 to 212-N by individually controlling, on the basis of data for controlling the timing for energization with current, which is data of the lower 16 bits of the luminance setting data that is data (Data) stored in the FiFo 201, the on or off of the switch transistors 211-1 to 211-N of the constant current source block 208 corresponding to the channels 1 to N that correspond to the columns in the array of the LEDs 141.

The row scan controlling section 206 acts on the basis of a synchronizing signal supplied from the synchronous controlling section 203, to control on or off of the switch transistors 207-1 to 207-M provided individually for the Scanlines for the M rows of the rows Scan 0 to Scan M, to thereby control emission of light or turning off of light of the LEDs 141 in a unit of a row.

The current source block 208 includes the constant current sources 212-1 to 212-N for the individual columns of the LEDs 141 defined by ch 0 to ch n and the switch transistors 211-1 to 211-N for individual connection of power supplies (VDD G, B).

The switch transistors 211-1 to 211-N are controlled by the individually corresponding PWM generators 202-1 to 202-N in such a manner as to be controlled to be turned on when the corresponding constant current sources 212-1 to 212-N are to be energized and controlled to be turned off in any other case.

In particular, the switch transistors 211-1 to 211-N are controlled to an on state only for a time length according to light emission intensities of the LEDs 141 to energize the corresponding current sources 212-1 to 212-N with current at predetermined time intervals by the PWM generators 202-1 to 202-N.

The constant current sources 212-1 to 212-N are controlled in current value thereof for energization by the current adjustment section 205 such that each of them becomes a current source by one of current values including, for example, the reference current value Ii, the current value Iu higher by the predetermined value than the reference current value Ii, and the current value Id lower by the predetermined value than the reference current value Ii.

As described above, by the control of on/off of the switch transistors 207-1 to 207-M that are controlled by the row scan controlling section 206 and on/off of the switch transistors 211-1 to 211-N that are controlled by the PWM generators 202-1 to 202-N, a control matrix of the LEDs 141 that configure the LED array 122 including the number of ScanLines (Scan 0 to Scan M)×the number of current sources (ch 0 to ch N) is configured such that emission of light of the individual LEDs 141 is controlled.

<Driving Control of LED by LED Driver of Present Disclosure>

(In Case where Setting of Light Emission Intensity of High Luminance is Required)

Now, driving control of the LED by the LED driver 121 of the present disclosure is described with reference to FIGS. 6 and 7.

Figure 6:
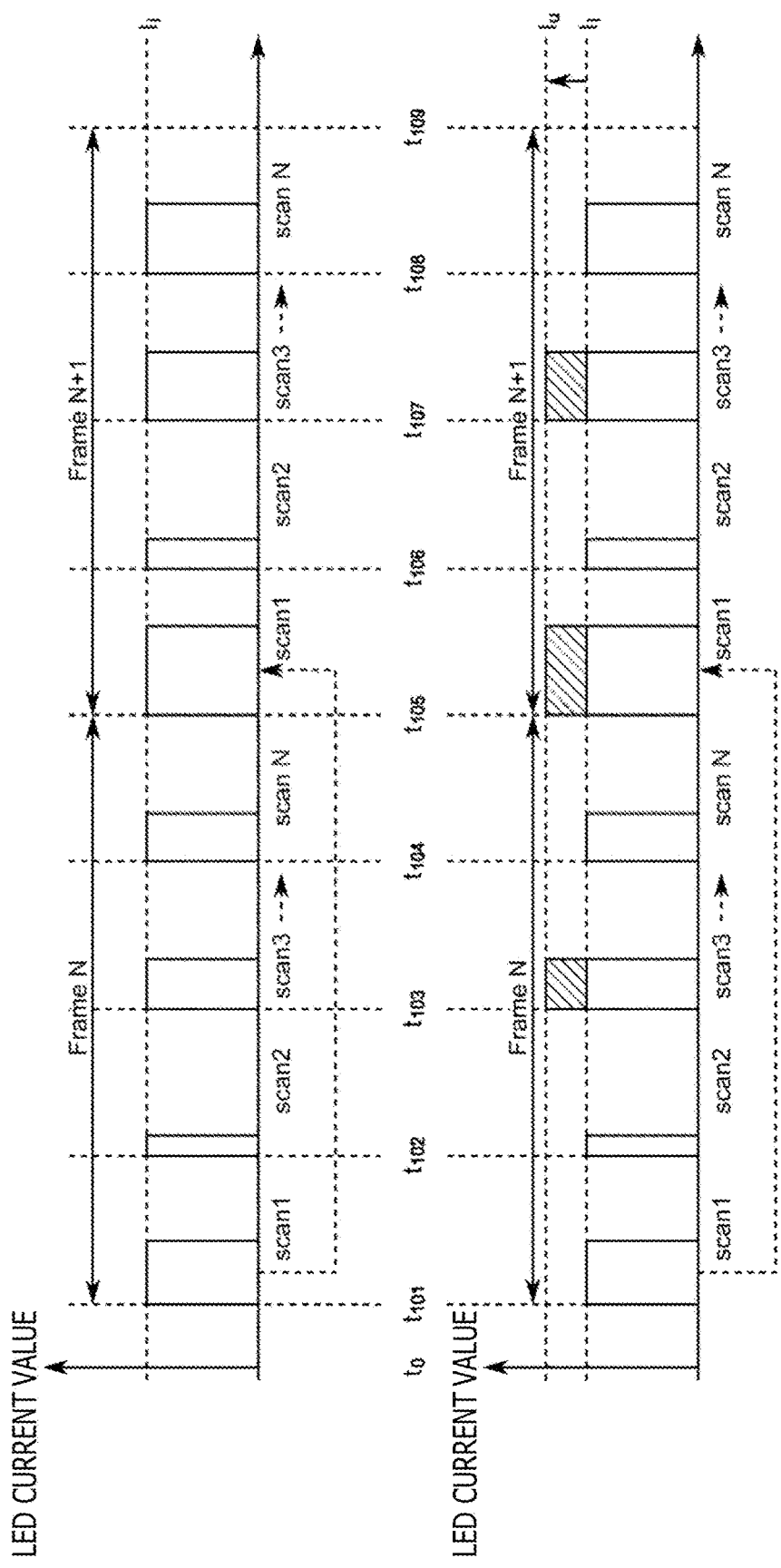
FIG. 6 is a timing chart illustrating a driving method of a driving circuit in FIG. 5.

The upper stage of FIG. 6 is a waveform diagram depicting a temporal change in LED current value when the light emission of an LED 141 is controlled by the PWM controlling method.

Figure 7:
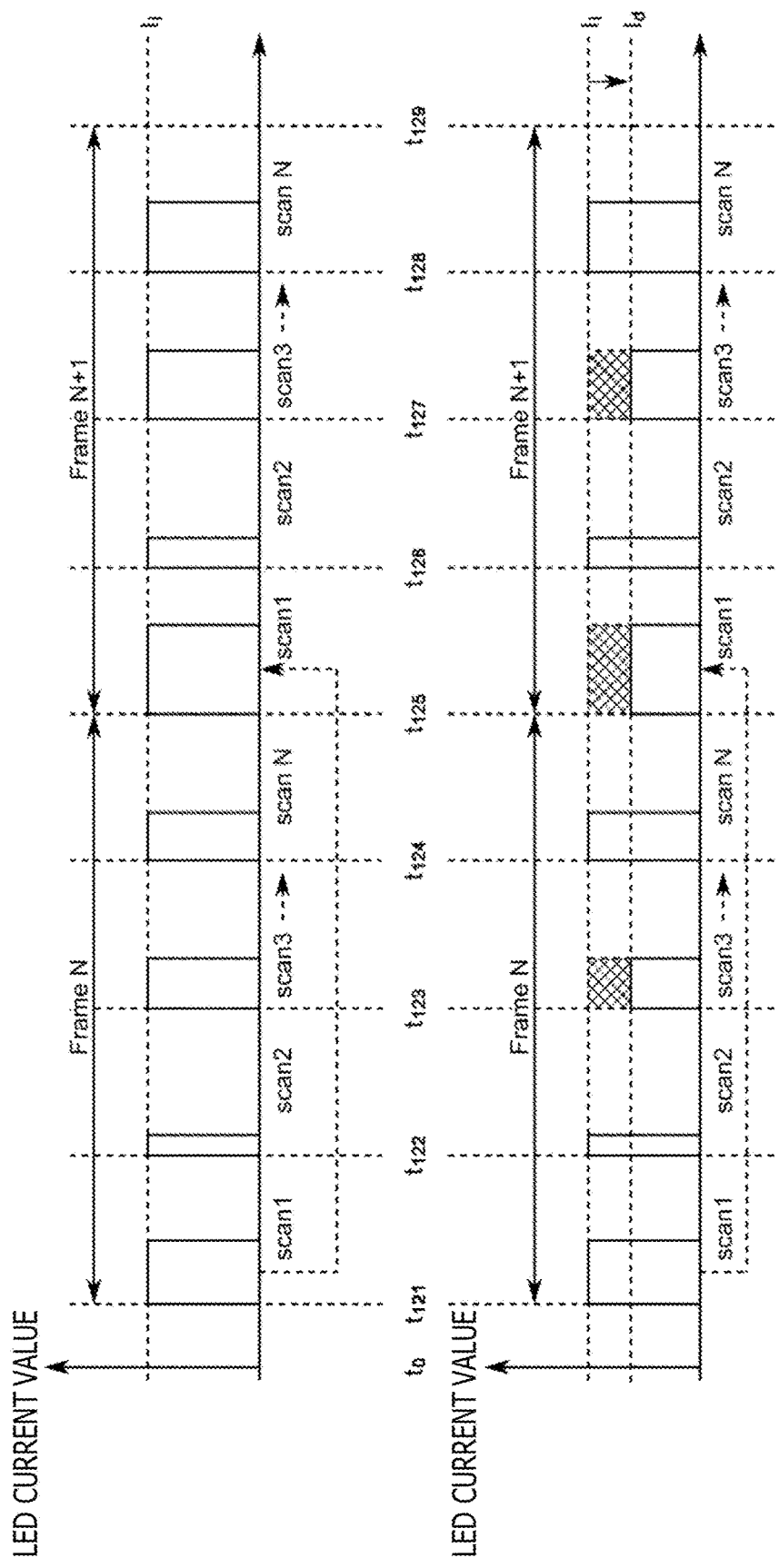
FIG. 7 is a timing chart illustrating a driving method of the driving circuit in FIG. 5.

It is to be noted that, in the examples of FIGS. 6 and 7, examples of the current value and the energization time when the scanlines (or pixels) 1 to N are energized in each frame (Frame) are depicted.

In particular, in the case of the PWM controlling method, as indicated by an arrow mark indicated by a broken line that connects two scan 1 in the upper stage of FIG. 6, the luminance when the LED 141 emits light varies depending upon a change of the energization time of the reference current value Ii for each Scanline (for each pixel) according to a luminance signal in each Frame.

In contrast, in the LED driver 121 of the present disclosure, in a case where a light emission intensity of a higher luminance is required, as indicated by the lower stage of FIG. 6, the current adjustment section 205 changes the current value, in addition to the energization time for energization of the LED 141 by the constant current source 212, on the basis of luminance setting data that is data (Data) for setting a light emission intensity.

In particular, in the lower stage of FIG. 6, it is indicated that, in scan 3 in the frame N and scan 1 and scan 3 in the frame N+1, the current value Iu increased by a predetermined value with respect to the reference current value Ii is used for energization as indicated by a slanting line portion.

In such a manner, in the LED driver 121 of the present disclosure, since the current value for energization can be changed as occasion demands in addition to control of the energization time for energization of the LED 141, at such a timing that setting of a light emission intensity of a higher luminance is required, it is possible to perform energization with the LED current value changed in such a manner as to be increased. Consequently, for example, even if a light emission intensity of such a high luminance that a sparkle is represented is requested, it is possible to emit light appropriately.

(In Case where Setting of Light Emission Intensity for Low Luminance is Required)

Further, it is also possible to use a similar method to reduce the LED current value to improve reproducibility of the lowest luminance.

In particular, in the LED driver 121 of the present patent application, in a case where a light emission intensity of a lower luminance is required, the current adjustment section 205 changes the current value of current for energization of the LED 141 from the constant current source 212 as indicated in the lower stage of FIG. 7, on the basis of the luminance setting data that is data (Data) for setting a light emission intensity.

In the lower stage of FIG. 7, it is indicated that a current value Id decreased by a predetermined value with respect to the reference current value Ii is used for energization as indicated by a slanting line grid portion at scan 3 of the Frame N and scan 1 and scan 3 of the Frame N+1.

Since the current value for energization of the LED 141 can be changed as occasion demands in such a manner, at such a timing that a particular setting of a light emission intensity of a low luminance is required, it is possible to reduce the current value for energization of the LED 141.

Consequently, it is possible to appropriately reproduce any luminance from the highest luminance to the lowest luminance, for example, without sacrificing the gradation of the PWM (PDM).

It is to be noted that, in regard to luminance setting data, the light emission control of the LED 141 is based on control by the energization time, and it is preferable to add control by the current value in a case where control of the energization time is difficult.

In particular, as described hereinabove, if it is customary that the current value for energization of the LED 141 is increased, then it is necessary to use a configuration that is compatible with high current not only for the LEDs 141 but also for various components, resulting in the possibility that the cost may increase.

If the basic control is control by the energization time, then it is only required that the current value to be used for ordinary control be the reference current value Ii, and therefore, also various components, including the LEDs 141, may be configured in such a manner as to be compatible with the reference current value Ii. Consequently, it is possible to suppress unnecessary increase of the cost and suppress also heat generation by energization.

Accordingly, the luminance setting data basically includes information for controlling the energization time of the LED 141 according to a luminance value, and especially in a case where a high luminance or a low luminance is demanded, it is desirable to set the luminance setting data such that control is performed by use of the current value in addition to control by use of the energization time.

<Example in which Current Value for Energization of LEDs is Changed in Unit of Row>

Light emission of the LEDs 141 may be controlled by performing one-time scanning in a unit of multiple rows and changing the time for which the LEDs 141 are energized by the PWM control and the current value for energization of the LEDs 141 in combination for each plural number of times.

Figure 8:
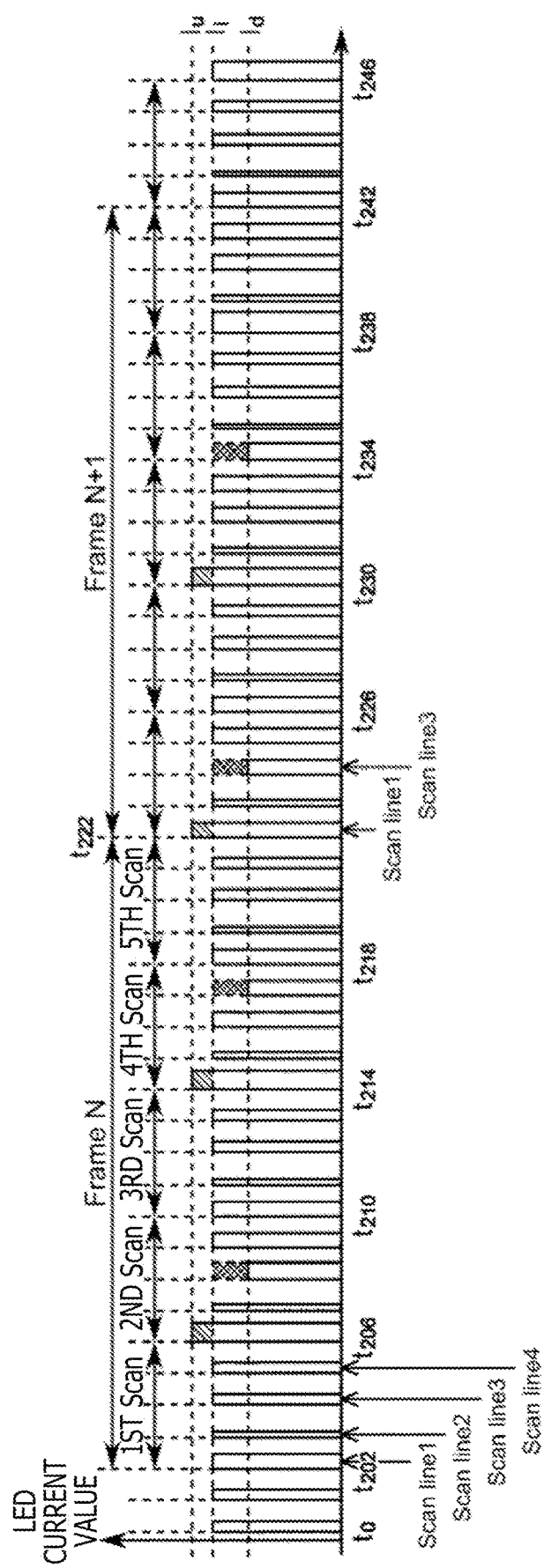
FIG. 8 is a timing chart illustrating a driving method for the LEDs in a unit of a row.

FIG. 8 depicts a change of the current value when the light emission is controlled by performing one-time scanning in a unit of four rows and changing the energization time and the current value for energization of the LEDs 141 by five times each.

In particular, at time t202 to time t205, changes of the energization time and the current value at the scanline 1 to scanline 4 of the Frame N are depicted.

Further, at time t206 to time t209, changes of the energization time and the current value at the scanline 1 to scanline 4 for the second time of the Frame N are depicted.

Moreover, at time t210 to time t213, changes of the energization time and the current value at the scanline 1 to scanline 4 for the third time of the Frame N are depicted.

In addition, at time t214 to time t217, changes of the energization time and the current value at the scanline 1 to scanline 4 for the fourth time of the Frame N are depicted.

Furthermore, at time t218 to time t221, changes of the energization time and the current value at the scanline 1 to scanline 4 for the fifth time of the Frame N are depicted.

Thereafter, control is performed in a similar manner also in the Frame N+1.

Then, in the example of FIG. 8, at times t206, t214, t222, and t230, the LED current value is the current value Iu increased from the reference current value Ii and the luminance is therefore increased, and at times t208, t217, t224, and t234, the LED current value is the current value Id decreased from the reference current value Ii and the luminance is therefore decreased.

Such control as just described makes it possible to represent a smooth luminance change in a unit of a row by repeated cyclical control of light emission by five times for the same row in the same frame. Further, since the current value for energization is increased or decreased with respect to the reference current value Ii as occasion demands, it is possible to appropriately reproduce the luminance from the highest luminance to the lowest luminance.

<Example in which Control is Performed in Unit of LED>

The foregoing description is given of an example in which multiple rows are set as a unit for one-time scanning and the time for which the LEDs 141 are energized by the PWM control and the current value for energization of the LEDs 141 are changed for each plural number of times to control emission of light of the LEDs 141.

However, the light emission intensity may be controlled otherwise by setting multiple rows as a unit for one-time scanning and controlling the energization time by the PWM control and the current value for energization of the LEDs 141 for each plural number of times each in a unit of multiple LEDs 141 in each row.

Figure 9:
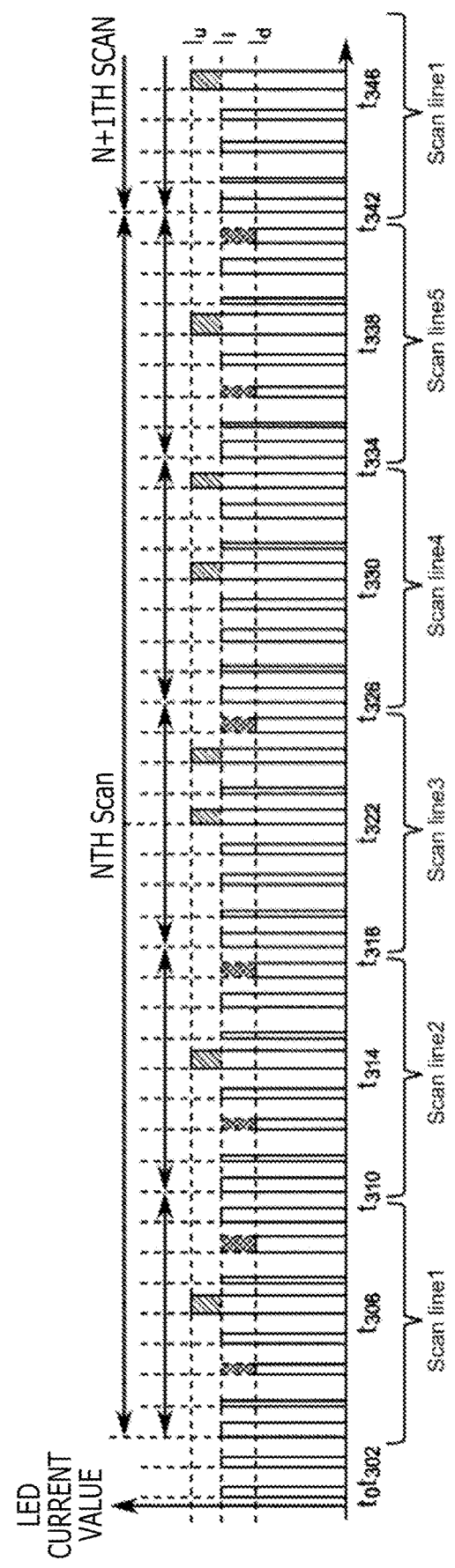
FIG. 9 is a timing chart illustrating a driving method for the LEDs in a unit of an LED.

FIG. 9 depicts a waveform indicative of a change of the current value when five rows are set as a unit for one-time scanning and light emission of the LEDs 141 is controlled in a unit of eight LEDs 141 for each row.

In particular, at time t302 to time t309, changes of time for which eight LEDs 141 in the scanline 1 for the Nth time Scan are energized by the PWM control and the current value for energization of the LEDs 141 are depicted.

Further, at time t310 to time t317, changes of time for which eight LEDs 141 in the scanline 2 for the Nth time Scan are energized by the PWM control and the current value for energization of the LEDs 141 are depicted.

Moreover, at time t318 to time t325, changes of time for which eight LEDs 141 in the scanline 3 for the Nth time Scan are energized and the current value for energization of the LEDs 141 are depicted.

In addition, at time t326 to time t333, changes of time for which eight LEDs 141 in the scanline 4 for the Nth time Scan are energized by the PWM control and the current value for energization of the LEDs 141 are depicted.

Furthermore, at time t334 to time t341, changes of time for which eight LEDs 141 in the scanline 5 for the Nth time Scan are energized by the PWM control and the current value for energization of the LEDs 141 are depicted.

Thereafter, control is performed in a similar manner for the N+1th Scan.

Then, in the example of FIG. 9, at times t306, t314, t322, t324, t330, t333, t338, and t346, the LED current value is the current value Iu increased from the reference current value Ii and the luminance is therefore increased, and at times t304, t308, t312, t317, t325, t336, and t341, the LED current value is the current value Id decreased from the reference current value Ii and the luminance is therefore decreased.

Such control as just described makes it possible to represent a smooth luminance change in a unit of an LED 141. Further, since the current value for energization is increased or decreased with respect to the reference current value Ii as occasion demands, it is possible to appropriately reproduce any luminance from the highest luminance to the lowest luminance.

<Increase of Current at Low Luminance>

Although the foregoing description is given of an example in which the light emission intensity is high and the LED current value is controlled to be increased when the luminance is to be increased, the LED current value is increased also when the luminance is to be decreased, in some cases.

The LED 141 includes, as an additional capacitance, a capacitance relating to the junction of the LED 141 (junction capacitance) and a capacitance relating to a wiring (wiring capacitance).

Figure 10:
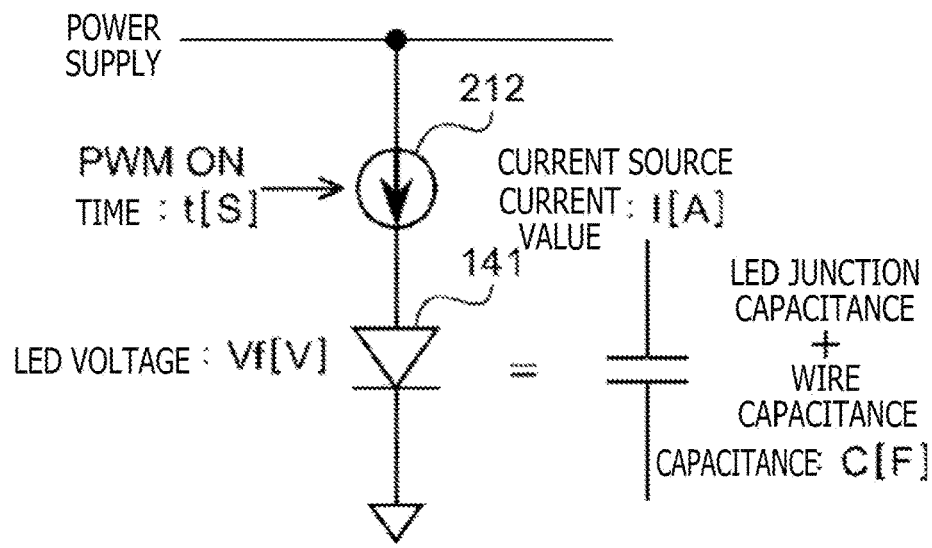
FIG. 10 is a diagram illustrating an additional capacitance of an LED.

Therefore, when the current value of current for energizing the LED 141 from the constant current source 212 is a current value I, the energization time when current is supplied from the constant current source 212 is time t, and the additional capacitance of the LED 141 is a capacitance C, as depicted in FIG. 10, in order to cause the LED 141 to emit light, a condition is that a voltage equal to or higher than a light emission voltage Vf that is used as a threshold value is required to be applied to the additional capacitance C. The relation that satisfies the condition just described is represented as the following expression (1).

$$Vf=I \times t/C \qquad (1)$$

Here, in a case where an instruction for emission of light of a low luminance that is lower than a predetermined luminance (lower than a predetermined light emission intensity), in the PWM control, if the energization time t of the LED current is shorter than the predetermined time, then the additional capacitance C cannot be charged sufficiently, resulting in a phenomenon that the LED 141 does not emit light.

Figure 11:
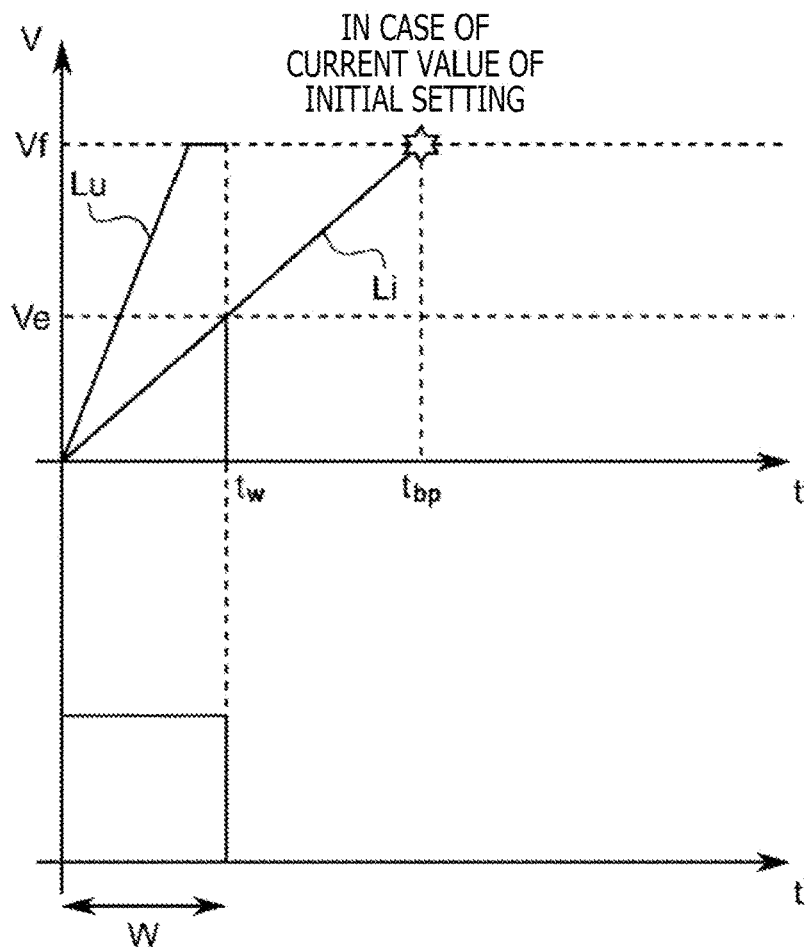
FIG. 11 is a diagram illustrating that the LED does not emit light if time for which current is supplied in PWM control is short.

This relation is represented as a graph in the upper stage of FIG. 11. The upper stage of FIG. 11 is a graph that represents the relation between the time t for which the LED current flows through the LED 141 after the constant current source 212 is turned on and a charging voltage V with which the additional capacitance C is charged. Meanwhile, the lower stage of FIG. 11 depicts a waveform of the current value for controlling the constant current source 212, and PWM control width W=energization time tw is depicted.

When the current value of the current source 212 for charging the additional capacitance C is the reference current value Ii, the charging voltage to the additional capacitance C is represented, for example, as indicated by a straight line Li. Therefore, in FIG. 11, the time t at which the light emission voltage Vf that is the threshold value for emission of light from the LED 141 is time tbp.

Meanwhile, it is assumed that, when the LED 141 is caused to emit light with a low luminance that is lower than the predetermined luminance, the time for which the reference current value Ii is supplied from the current source 212 to the LED 141 by the PWM control, that is, the PWM control width W (=energization time), is the time tw as indicated by the lower portion of FIG. 11.

In this case, the capacitance C is charged with the current value Ii from the current source 212. However, even if the additional capacitance C is charged for the time tw, since the charging voltage becomes only up to a voltage Ve (<Vf), the additional capacitance C cannot be charged to a sufficient voltage with which emission of light from the LED 141 is possible, and it is impossible to cause the LED 141 to emit light.

It is to be noted that the gradient of the straight line Li indicating the charging voltage when the capacitance C is charged with the current value Ii in FIG. 11 is the current value Ii itself.

In view of this, for example, as indicated by a straight line Lu in FIG. 11, the current value of current for energization from the current source 212 is increased by a predetermined value with respect to the reference current value Ii such that the additional capacitance C of the LED 141 can be charged to the voltage Vf in a period of time shorter than the time tw.

Figure 12:
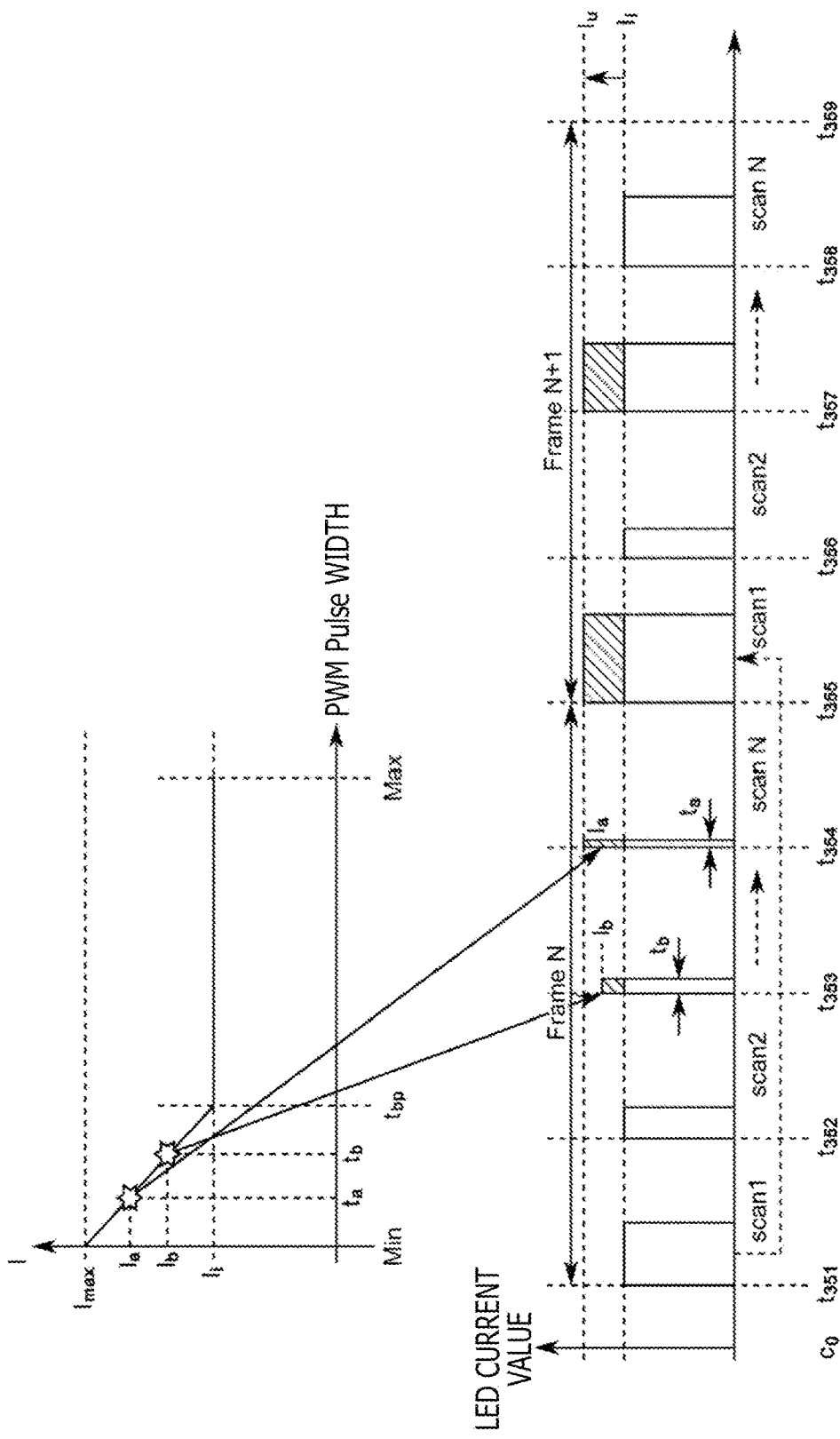
FIG. 12 is a diagram illustrating control of a LED current value when the time for which current is supplied in the PWM control is short.

More particularly, the current value I is set as indicated at an upper left portion of FIG. 12. At the upper left portion of FIG. 12, depicted is a graph which represents a relation between the PWM control width (PWM pulse width) (energization time from the current source 212) in the PWM control and the current value with which the LED 141 can emit light.

As depicted in FIG. 12, when the PWM control width (PWM pulse width=energization time) is 0 that is the minimum value, maximum current Imax is required. However, if the PWM control width (PWM pulse width=energization time) increases, then the current value I that is necessary for light emission gradually decreases, and after the PWM control width (PWM pulse width=energization time) exceeds the time tbp of the threshold value, the current value I becomes fixed at the reference current value Ii.

In particular, in a case where the energization time is longer than the time tbp of the threshold value, even if the current value for energization of the LED 141 is the reference current value Ii, the LED 141 emits light. However, if the energization time becomes shorter than the time tbp, then it is necessary to increase the current value I by an amount equal to the decreasing amount.

Therefore, for example, when the PWM pulse width (=energization time) is time to as indicated at time t354 at a lower portion of FIG. 12, it is necessary to set the current to be supplied from the current source 212 to a current value Ia as depicted at an upper portion of FIG. 12.

In addition, similarly, for example, when the PWM pulse width (=energization time) is time tb as indicated at time t353 at the lower portion of FIG. 12, it is necessary to set the current to be supplied from the current source 212 to a current value Ib as indicated at the upper portion of FIG. 12.

In the manner described above, even in such a case that the luminance is set to a low luminance, it is necessary to increase the current value for energization from the constant current source 212 according to the additional capacitance C provided in the LED 141, in some cases. The current adjustment section 205 adjusts the current value to be outputted from the constant current source 212, taking also the additional capacitance C provided by the LED 141 into consideration in such a manner.

<Expansion to HDR>

Figure 13:
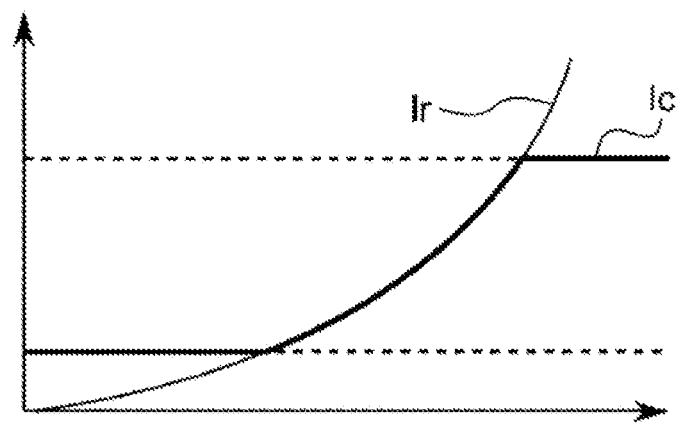
FIG. 13 is a diagram illustrating expansion of a dynamic range by the driving circuit of the present disclosure.
Figure 13:
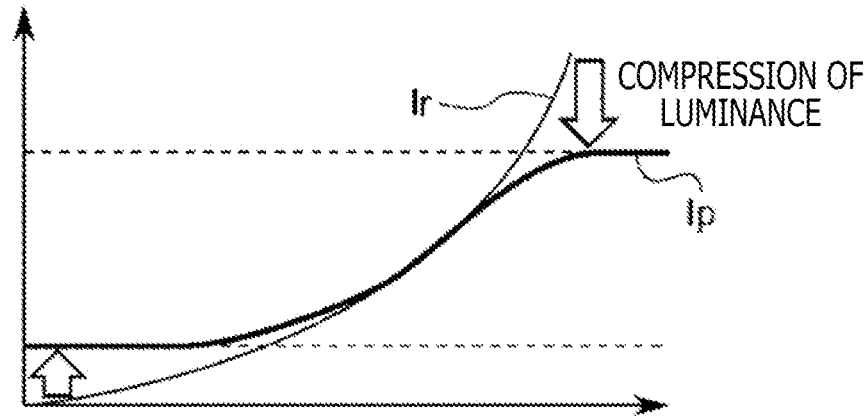
Figure 13:
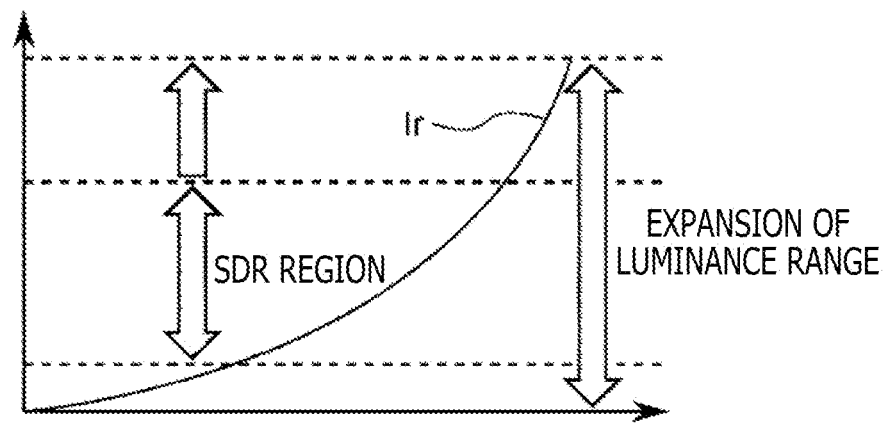

Such a display that does not have a sufficient maximum luminance like a conventional CRT display can represent only such a low contrast image that a halation area or a dark area outstands because, in the SDR (Standard Dynamic Range) indicated as a band between two broken lines indicated in the upper stage of FIG. 13, an original luminance curve (gamma curve) Ir is cut at an upper limit and a lower limit thereof as indicated by a luminance curve Ic of a thick line.

Therefore, as depicted in the middle stage of FIG. 13, for the luminance that exceeds the boundary between the SDR indicated by broken lines and the original luminance curve Ir, even if the luminance is within the SDR with respect to the original luminance curve Ir, an image gradation representation in which a halation area or a dark area does not outstand by compressing the luminance, even if the image is a low contrast image within the SDR, has been performed. However, since the luminance curve Ip of the SDR is determined on the basis of a narrow luminance range of approximately 0.05 to 100 cd/m$^2$, there is a problem that a display device that is compatible with a greater luminance range cannot perform a sufficient gradation representation in comparison with the performance of such a device. Therefore, an image signal and a display device that are compatible with the HDR (High Dynamic range) corresponding to a greater luminance range than that of the SDR as indicated in the lower stage of FIG. 13 have been popularized. For example, a luminance curve of the PQ (Perceptual Quantization) method that is compatible with a maximum luminance of 10000 cd/m$^2$ and so forth have been prescribed, and a video signal and so forth compatible with a maximum luminance of 1000 to 10000 cd/m$^2$ exceeding 100 cd/m$^2$ are available.

The LED driver 121 of the present disclosure may be compatible with a luminance level designated by an HDR image signal (video signal), and as an example, it is possible to represent a high contrast image by control, for a luminance level exceeding 0.05 to 100 cd/m$^2$, of the current value for energization of the LED 141 in addition to control of the energization time by the PWM control with the current for energization of the LED 141.

<Display Process>

Figure 14:
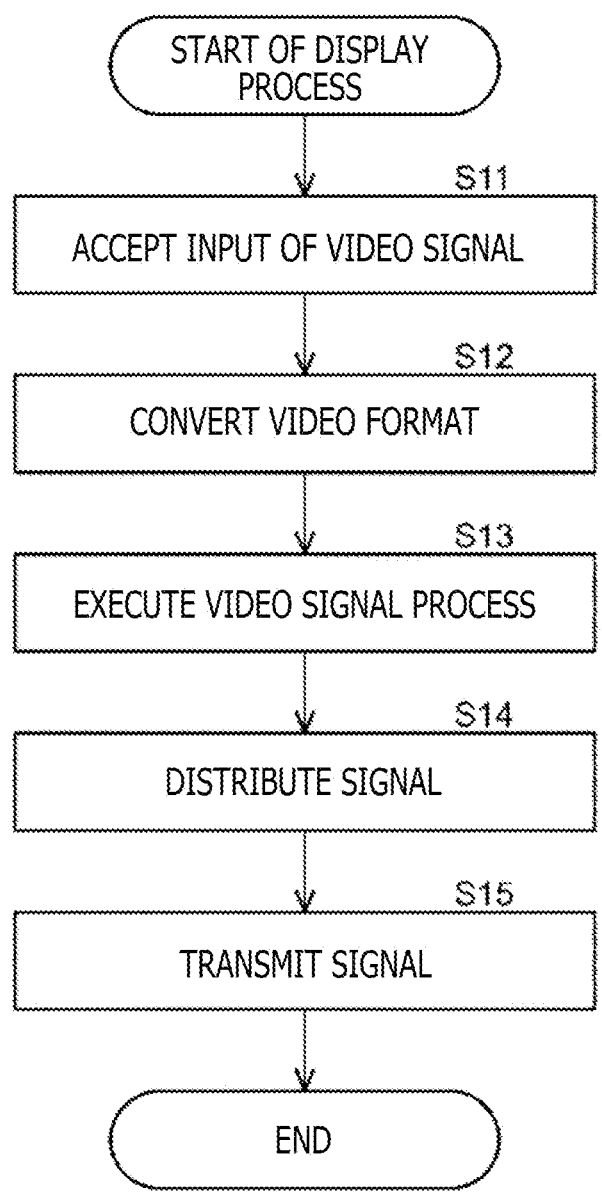
FIG. 14 is a flow chart illustrating a displaying process.

Now, a display process by the display system 11 of FIG. 1 is described with reference to a flow chart of FIG. 14.

In step S11, the signal processing section 78 accepts an input of a video signal that includes content data and so forth and that is supplied from the video server 31 via any one of the HDMI terminal 72, the DP terminal 73 and the DVI terminal 74 and the signal input IF 77.

In step S12, the signal processing section 78 converts the video format of the video signal whose input is accepted.

In step S13, the signal processing section 78 accepts an input of a control signal supplied from the MPU 76 supplied according to contents of an operation of the PC 30 and executes a signal process for a color temperature, contrast, brightness, and so forth.

In step S14, the signal processing section 78 allocates and distributes, to the display units 51-1 to 51-n of the video wall 33, the video signal for which the signal process has been performed.

In step S15, the signal processing section 78 transmits and outputs the distributed video signals to the corresponding display units 51-1 to 51-n.

By the series of processes described above, the signal process is performed for the video signal read out from the video server 31, and resulting video signals are individually distributed and transmitted to the display units 51-1 to 51-n configuring the video wall 33. Consequently, the individual video images are displayed on the display units 51-1 to 51-n, and therefore, the video wall 33 can display the video image of the video content as a whole.

<Driver Controlling Process by Display Unit>

Figure 15:
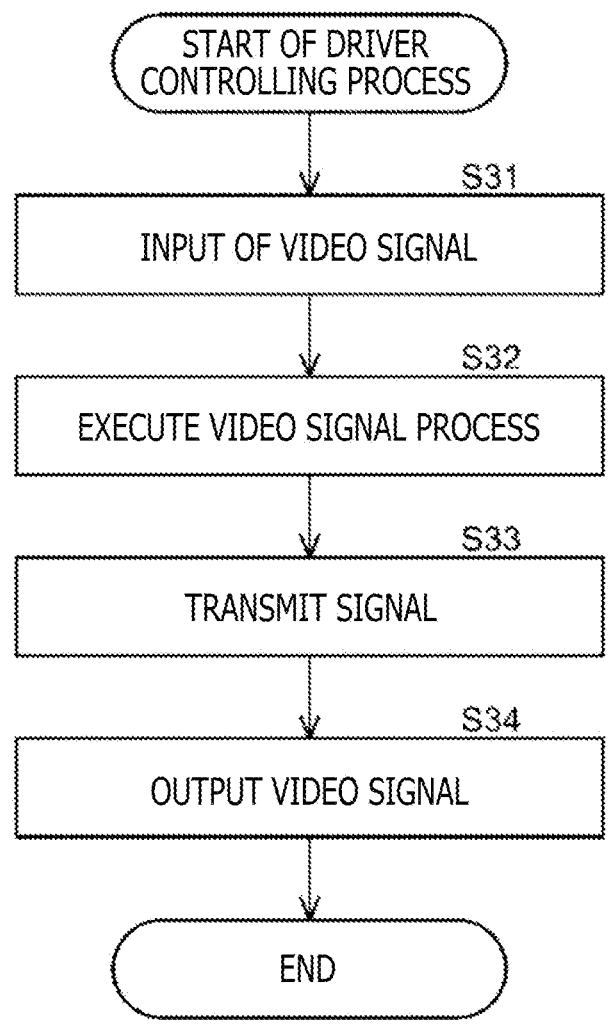
FIG. 15 is a flow chart illustrating a driver controlling process.

Now, a driver controlling process by the display unit 51 is described with reference to a flow chart of FIG. 15.

In step S31, the signal processing section 112 in the driver controlling section 91 of the display unit 51 accepts an input of a video signal distributed and supplied thereto from the video wall controller 32, via the signal input IF 111.

In step S32, the signal processing section 112 executes, for the video signal distributed as the display unit 51, a video signal process for performing color and luminance correction corresponding to the individual display unit 51.

In step S33, the signal processing section 112 allocates the video signal for which the video signal process has been performed, to the LED drivers 121-1 to 121-N of the LED block 92, and transmits the video signals via the corresponding output IFs 114-1 to 114-N.

In step S34, the LED drivers 121-1 to 121-N of the LED block 92 execute an LED driving controlling process and performs adjustment, in addition to the PWM control, on the LED current value for the LED arrays 122-1 to 122-N such that video images are displayed in appropriate luminances.

By the processes described above, the display units 51 configuring the video wall 33 individually perform appropriate luminance adjustment and output video images to the LED block 92, and the video images can be displayed.

<LED Driving Controlling Process>

Figure 16:
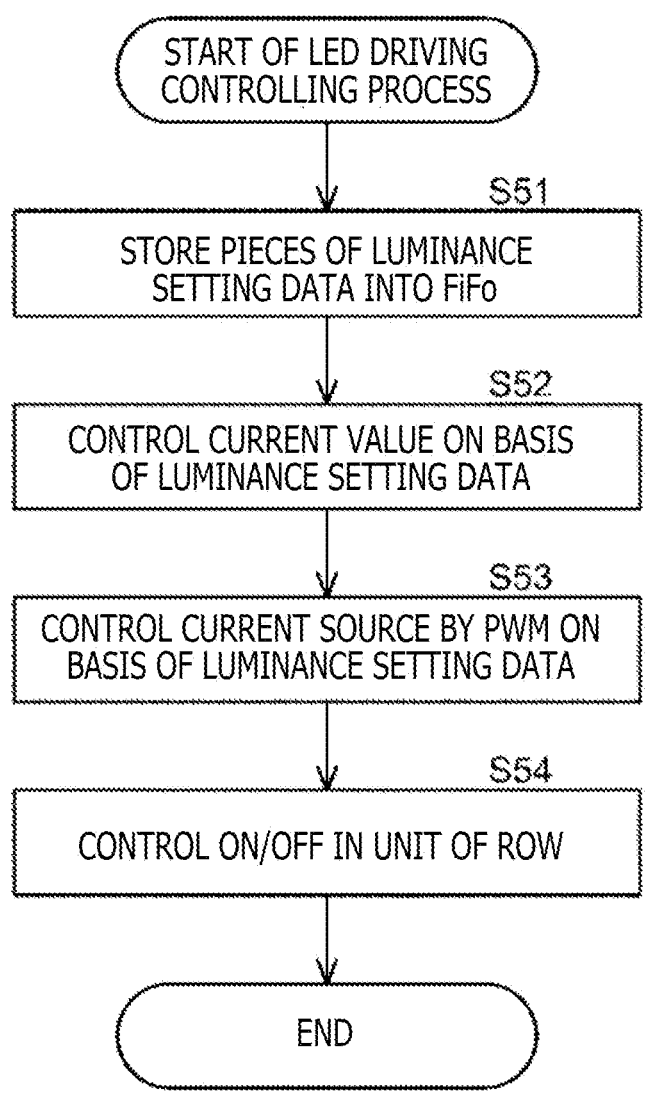
FIG. 16 is a flow chart illustrating an LED driving controlling process.

Now, an LED driving controlling process, performed by the LED driver 121 in the LED block 92, for controlling driving of the individual LEDs 141 provided in the LED array 122 is described with reference to a flow chart of FIG. 16.

In step S51, the FiFo (First In First Out) 201 acquires video signals for which the video signal process has been performed, via the luminance controlling signal interface (Sig data I/F), and temporarily stores the video signals as pieces of luminance control data that are pieces of data (Data) for setting light emission intensities for the LEDs 141.

In particular, in the FiFo 201, information for setting a timing (energization time) for energizing each LED 141 with current and information for setting a current value of current for energizing the LED 141 are stored as luminance setting data in association with luminance information included in a video signal.

In step S52, the current adjustment section 205 sets, on the basis of the luminance setting data that is the data (Data) stored in the FiFo 201, current values (R/G/B Current control) when current is to flow through the individual current sources 212-1 to 212-N in the current source block 208 in synchronism with a timing at which the current that is controlled by the PWM generator 202 is to be passed.

In step S53, the PWM generators 202-1 to 202-N control, individually for the channels 1 to N, on or off of the switch transistors 211-1 to 211-N of the corresponding constant current source block 208 at a timing (energization time) based on luminance setting data that is data (Data) for setting a light emission intensity stored in the FiFo 201, on the basis of a synchronizing signal supplied from the synchronous controlling section 203.

By this process, each of the constant current sources 212-1 to 212-N is controlled in terms of the current value by the current adjustment section 205, so that on or off thereof is controlled with a current value that is set, for example, to any one of the reference current value Ii, the current value Iu higher by a predetermined value than the reference current value Ii, and the current value Id lower by a predetermined value than the reference current value Ii, and passes current to the LED 141 only for an energization time during which it is controlled to on.

In step S54, the row scan controlling section 206 acts on the basis of the synchronizing signal supplied from the synchronous controlling section 203, to control on or off of the switch transistors 207-1 to 207-M provided individually for the scanlines for the M rows of the rows Scan 0 to Scan M and thereby control emission of light or turning off of light of the LEDs in a unit of a row.

By the processes described above, the switch transistors 211-1 to 211-N are controlled to an on state for a period according to the light emission intensities of the LEDs 141 at predetermined time intervals by the PWM generators 202-1 to 202-N to pass current only for corresponding time periods to the corresponding current sources 212-1 to 212-N.

At this time, the current sources 212-1 to 212-N are controlled in terms of the current value for energization by the current adjustment section 205, so that they energize the LEDs 141 with current of current values each set, for example, to any one of the reference current value Ii, the current value Iu higher by a predetermined value than the reference current value Ii, and the current value Id lower by a predetermined value than the reference current value Ii.

As a result, it becomes possible to expand the dynamic range of the SDR by a necessary amount, and therefore, expansion to the HDR becomes possible, and it becomes possible to reproduce a luminance proximate to an actual luminance curve and perform display.

Further, since the control of the current value of current for energizing the LED 141 is implemented on the real time basis in response to a video signal as in the control of the energization time, even if the current value temporarily increases, the increased current value is not always used.

Consequently, such a countermeasure as to use, for the LEDs 141, an LED of a type compatible with high current and to use, for a drive system, a wiring resistance, a power supply, and so forth, those that are compatible with high current is unnecessary. Further, it is sufficient only if the current adjustment section 205 controls the current value on the basis of luminance setting data stored in the FiFo 201. Therefore, it is possible to implement expansion of the dynamic range easily at a low cost.

Further, the light emission control of the LED 141 may be performed by controlling the time and the current value for energization only in response to an input of a video signal or an image signal of the luminance level of the HDR or a maximum luminance that exceeds the SDR, or the light emission control of the LED 141 may be performed by expanding the dynamic range for a video signal or an image signal of the luminance level of the SDR and controlling the time and the current value for energization in the expanded high luminance region. As an example, in a case where an image of a luminance level exceeding 0.05 to 100 cd/m$^2$ is displayed irrespective of the input signal, the LED driver 121 may perform the light emission control of the LED 141 by using both the PWM control and the PAM control, or in a case where an image of a luminance level exceeding the luminance level of 1000 cd/m$^2$ for which a reference display that is used for creation of a high luminance image is ready is to be displayed, the LED driver 121 may perform the light emission control of the LED 141 by using both the PWM control and the PAM control. However, the application of the technology of the present disclosure is not restricted to the cases described above, and the technology of the present disclosure can be applied irrespective of an input signal or a particular luminance level.

It is to be noted that, although the foregoing description is given of an example in which the video wall 33 in which multiple display units 51 are arranged in tile-like arrangement displays one image as a whole, since it is only required to configure the video wall 33 such that the LEDs 141 are arranged in an array, the video wall 33 may be applied to a backlight that is implemented, for example, by multiple display units 51 arranged in tile-like arrangement.

Further, while the technology of the present disclosure controls the luminance of the LED 141 with the energization time for energization of the LED 141 and the current value to be used for the energization, in other words, it can also be considered that the technology of the present disclosure uses the PAM control in addition to the PWM control for the light emission control of the LED 141.

In particular, it can also be considered that the LED driver 121 of the present disclosure basically controls light emission of the LED 141 by the PWM control and uses, in a case where light emission control by a higher luminance is required or in a case where light emission control by a lower luminance is required, an assistance of the PAM control for the light emission control as occasion demands.

Since such a configuration as just described eliminates the necessity for design that supposes high current, the dynamic range can be expanded inexpensively at a low cost.

<<2. Example of Practical Use>>

Although the foregoing description is given of an example in which the necessary dynamic range is expanded by, in addition to the PWM control, increasing or decreasing the current value for energization of the LED 141 according to a control timing of the PWM control, there is a possibility that, by a change of the current value of current for energization of the LED 141, a change may occur with the wavelength of light to be emitted from the LED 141.

Therefore, it may be made possible to suppress the variation of the wavelength arising from the LED current value, by storing in advance, in an LUT (Look Up Table), information regarding the energization time for correcting the wavelength variation of the LED 141 corresponding to the change of the LED current value or by providing an arithmetic circuit that computes an energization time according to a wavelength variation of the LED 141.

Figure 17:
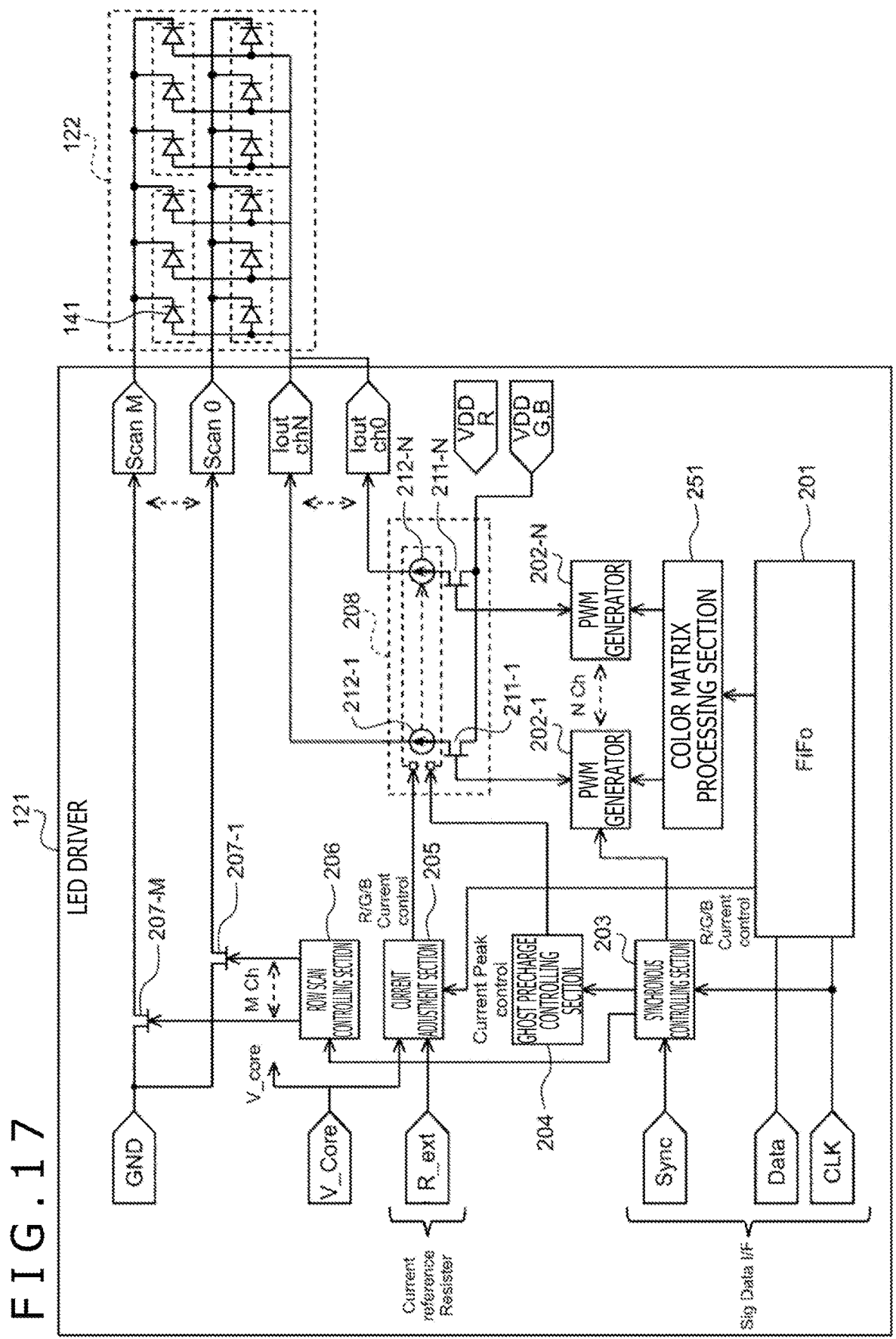
FIG. 17 is a flow chart illustrating a modification of the LED driver.

FIG. 17 depicts an example of a configuration of the LED driver 121 that includes a color matrix processing section 251 in which information regarding energization time for suppressing a variation of the wavelength that arises from the current value for energization of the LED 141 is stored in advance.

The color matrix processing section 251 includes, for example, an LUT (Look Up Table) or the like and has stored therein information for correcting the energization time of the constant current source 212 in the PWM control, such that a waveform variation of light to be emitted from the LED 141, which arises from a change of the current value for energization of the LED 141, is suppressed. The PWM generator 202 controls on or off of the current source 212 on the basis of the information regarding energization time corrected according to the current value by the color matrix processing section 251.

This makes it possible to appropriately set a luminance even if the current value for energization of the LED 141 changes.

It is to be noted that, since it is sufficient if the color matrix processing section 251 can determine an energization time such that a wavelength variation of light to be emitted from the LED 141, which arises from a change of the current value for energization of the LED 141, can be suppressed, the color matrix processing section 251 may not necessarily have such a component as an LUT and may be, for example, a linear arithmetic device that can compute, for example, energization time that is corrected according to the current value.

It is to be noted that the present disclosure can also adopt the following configurations.

<1>

A driving controlling device including:

an energization time controlling section that controls energization time for energizing an LED (Light Emitting Diode) with current to control a light emission luminance of the LED; and a current value controlling section that controls a current value of the current for energizing the LED, to control the light emission luminance of the LED.

<2>

The driving controlling device according to <1>, in which the current value controlling section controls the current value of the current for energizing the LED, on the basis of a luminance of an inputted video signal, to control the light emission luminance of the LED.

<3>
The driving controlling device according to <2>, in which the current value controlling section selects any one of multiple predetermined current values of the current for energizing the LED on the basis of the luminance of the inputted video signal and controls such that the LED is energized with the current of the selected current value, to control the light emission luminance of the LED.

<4>
The driving controlling device according to <3>, in which the current value controlling section controls such that the LED is energized with the current of any one of a reference current value, a current value higher than the reference current value, and a current value lower than the reference current value, on the basis of the luminance of the inputted video signal, to control the light emission luminance of the LED.

<5>
The driving controlling device according to <1>, in which the current value controlling section controls, in a case where a luminance of an inputted video signal is higher than a predetermined luminance value, the light emission luminance of the LED on the basis of control of the current value of the current for energizing the LED.

<6>
The driving controlling device according to <5>, in which the current value controlling section controls such that, in the case where the luminance of the inputted video signal is higher than the predetermined luminance value, the current for energizing the LED is used for the energization with a current value higher than a reference current value to control the light emission luminance of the LED.

<7>
The driving controlling device according to <1>, in which the current value controlling section controls, in a case where a luminance of an inputted video signal is lower than a predetermined luminance value, the light emission luminance of the LED on the basis of control of the current value of the current for energizing the LED.

<8>
The driving controlling device according to <7>, in which the current value controlling section controls such that, in the case where the luminance of the inputted video signal is lower than the predetermined luminance value, the current for energizing the LED is used for the energization with a current value lower than a reference current value, to control the light emission luminance of the LED.

<9>
The driving controlling device according to <7>, in which the current value controlling section controls, in the case where the luminance of the inputted video signal is lower than the predetermined luminance value, the light emission luminance of the LED on the basis of the current value of the current for energizing the LED, with an additional capacitance of the LED taken into consideration.

<10>
The driving controlling device according to <9>, in which the current value controlling section controls such that, in the case where the luminance of the inputted video signal is lower than the predetermined luminance value, the LED is energized with the current of a current value with which a charging voltage according to the additional capacitance of the LED exceeds a threshold value during energization time controlled by the energization time controlling section, with the additional capacitance of the LED taken into consideration, to control the light emission luminance of the LED.

<11>
The driving controlling device according to <1>, in which,
in a case where the current value controlling section controls such that the LED is energized with current of a current value different from a reference current value, the energization time controlling section controls the energization time such that a wavelength variation of light emitted from the LED, the wavelength variation being caused by the energization of the LED with current of a current value different from the reference current value, is corrected, to control the light emission luminance of the LED.

<12>
The driving controlling device according to <11>, further including:
a storage section that stores therein information regarding the energization time for correcting a wavelength variation that occurs when the LED is energized with current of a current value different from the reference current value, in which,
in the case where the current value controlling section controls such that the LED is energized with the current of a current value different from the reference current value, the energization time controlling section controls the light emission luminance of the LED on the basis of the information regarding the energization time for correcting the wavelength variation stored in the storage section.

<13>
The driving controlling device according to <11>, further including:
an arithmetic section that computes the energization time for correcting a wavelength variation that occurs when the LED is energized with the current of a current value different from the reference current value, and,
in the case where the current value controlling section controls such that the LED is energized with the current of a current value different from the reference current value, the energization time controlling section controls the light emission luminance of the LED on the basis of the information regarding the energization time for correcting the wavelength variation computed by the arithmetic section.

<14>
The driving controlling device according to any one of <1> to <13>, further including:
a constant current source that energizes the LED with current, in which
the energization time controlling section controls the light emission luminance of the LED on the basis of the energization time for which the constant current source is to energize the LED with the current, and
the current value controlling section controls the light emission luminance of the LED on the basis of a current value of the current with which the constant current source energizes the LED.

<15>
The driving controlling device according to any one of <1> to <14>, in which
the current value controlling section controls such that, in a case where the light emission luminance of the LED is a luminance outside a range of 0.05 to 100 cd/m$^2$, the current value of the current for energizing the LED is controlled, to control the light emission luminance of the LED.

<16>

The driving controlling device according to <2>, in which the video signal includes a video signal compatible with an HDR (High Dynamic Range).

<17>

The driving controlling device according to <2>, in which the current value controlling section controls, in a case where the luminance of the video signal exceeds 100 cd/m², the light emission luminance of the LED on the basis of control of the current value of the current for energizing the LED.

<18>

The driving controlling device according to <2>, in which the current value controlling section controls, in a case where the luminance of the video signal exceeds 1000 cd/m², the light emission luminance of the LED on the basis of control of the current value of the current for energizing the LED.

<19>

A driving controlling method for a driving controlling device that includes an energization time controlling section and a current value controlling section, the driving controlling method including:
controlling, by the energization time controlling section, energization time for energizing an LED (Light Emitting Diode) with current, to control a light emission luminance of the LED; and
controlling, by the current value controlling section, a current value of the current for energizing the LED, to control the light emission luminance of the LED.

<20>

An information processing system including:
a display section including a display unit having LEDs (Light Emitting Diodes) arranged in an array and a driving controlling device that controls driving of the LEDs; and
a distribution section that accepts an input of a video signal, performs a predetermined signal process for the video signal, and distributes the resulting video signal to the display unit, in which
the driving controlling device includes
an energization time controlling section that controls energization time for energizing the LEDs with current, to control light emission luminances of the LEDs, and
a current value controlling section that controls a current value of the current for energizing the LEDs, to control the light emission luminances of the LEDs.

REFERENCE SIGNS LIST

11: Display system
30: PC
31: Video server
32: Video wall controller
33: Video wall
51, 51-1 to 51-$n$: Display unit
78: Signal processing section
91: Driver controlling section
92: Driver block
112: Signal processing section
121, 121-1 to 121-N: Driving circuit
122: Pixel array
141: Pixel (LED)
201: FiFo
202, 202-1 to 202-N: PWM generator
203: Synchronous controlling section
204: Ghost precharge controlling section
205: Current adjustment section
206: Row scan controlling section
207, 207-1 to 207-M: Switch transistor
208: Current source block
211, 211-1 to 211-N: Constant current source
212, 212-1 to 212-N: Switching transistor
251: LUT

The invention claimed is:

1. A driving controlling device comprising:
circuitry configured to
control energization time for energizing an LED (Light Emitting Diode) with current to control a light emission luminance of the LED; and
control a current value of the current for energizing the LED, to control the light emission luminance of the LED,
wherein the circuitry comprises a constant current source configured to energize the LED with current, and
wherein the circuitry is configured to control the light emission luminance of the LED on a basis of the energization time for which the constant current source is energizes the LED with the current, and to control the light emission luminance of the LED on a basis of a current value of the current with which the constant current source energizes the LED.

2. The driving controlling device according to claim 1, wherein
the circuitry is configured to control the current value of the current for energizing the LED, on a basis of a luminance of an inputted video signal, to control the light emission luminance of the LED.

3. The driving controlling device according to claim 2, wherein the circuitry is configured to select any one of multiple predetermined current values of the current for energizing the LED on the basis of the luminance of the inputted video signal and controls such that the LED is energized with the current of the selected current value, to control the light emission luminance of the LED.

4. The driving controlling device according to claim 2, wherein
the circuitry is configured to control such that the LED is energized with the current of any one of a reference current value, a current value higher than the reference current value, and a current value lower than the reference current value, on the basis of the luminance of the inputted video signal, to control the light emission luminance of the LED.

5. The driving controlling device according to claim 1, wherein
the circuitry is configured to control, in a case where a luminance of an inputted video signal is higher than a predetermined luminance value, the light emission luminance of the LED on a basis of control of the current value of the current for energizing the LED.

6. The driving controlling device according to claim 5, wherein
the circuitry is configured to control such that, in the case where the luminance of the inputted video signal is higher than the predetermined luminance value, the current for energizing the LED is used for the energization with a current value higher than a reference current value to control the light emission luminance of the LED.

7. The driving controlling device according to claim 1, wherein
the circuitry is configured to control, in a case where a luminance of an inputted video signal is lower than a predetermined luminance value, the light emission luminance of the LED on a basis of control of the current value of the current for energizing the LED.

8. The driving controlling device according to claim 7, wherein
the circuitry is configured to control such that, in the case where the luminance of the inputted video signal is lower than the predetermined luminance value, the current for energizing the LED is used for the energization with a current value lower than a reference current value, to control the light emission luminance of the LED.

9. The driving controlling device according to claim 7, wherein
the circuitry is configured to control, in the case where the luminance of the inputted video signal is lower than the predetermined luminance value, the light emission luminance of the LED on a basis of the current value of the current for energizing the LED, with an additional capacitance of the LED taken into consideration.

10. The driving controlling device according to claim 9, wherein
the circuitry is configured to control such that, in the case where the luminance of the inputted video signal is lower than the predetermined luminance value, the LED is energized with the current of a current value with which a charging voltage according to the additional capacitance of the LED exceeds a threshold value during the controlled energization time, with the additional capacitance of the LED taken into consideration, to control the light emission luminance of the LED.

11. A driving controlling device, comprising:
circuitry configured to
control energization time for energizing an LED (Light Emitting Diode) with current to control a light emission luminance of the LED; and
control a current value of the current for energizing the LED, to control the light emission luminance of the LED,
wherein in a case where the circuitry controls such that the LED is energized with current of a current value different from a reference current value, the circuitry is configured to control the energization time such that a wavelength variation of light emitted from the LED, the wavelength variation being caused by the energization of the LED with current of a current value different from the reference current value, is corrected, to control the light emission luminance of the LED.

12. The driving controlling device according to claim 11, wherein the circuitry further comprises:
a storage configured to store therein information regarding the energization time for correcting a wavelength variation that occurs when the LED is energized with current of a current value different from the reference current value, and
in the case where the circuitry controls such that the LED is energized with the current of a current value different from the reference current value, the circuitry is configured to control the light emission luminance of the LED on a basis of the information regarding the energization time for correcting the wavelength variation stored in the storage.

13. The driving controlling device according to claim 11, wherein the circuitry is further configured to compute:
the energization time for correcting a wavelength variation that occurs when the LED is energized with the current of a current value different from the reference current value, and
in the case where the circuitry controls such that the LED is energized with the current of a current value different from the reference current value, the circuitry is configured to control the light emission luminance of the LED on a basis of the information regarding the computed energization time for correcting the wavelength variation.

14. The driving controlling device according to claim 11, wherein the circuitry comprises
a constant current source configured to energize the LED with current, and wherein the circuitry is configured to control the light emission luminance of the LED on a basis of the energization time for which the constant current source is to energize the LED with the current, and
to control the light emission luminance of the LED on a basis of a current value of the current with which the constant current source energizes the LED.

15. The driving controlling device according to claim 1, wherein
the circuitry is configured to control such that, in a case where the light emission luminance of the LED is a luminance outside a range of 0.05 to 100 $cd/m^2$, the current value of the current for energizing the LED is controlled, to control the light emission luminance of the LED.

16. The driving controlling device according to claim 2, wherein
the video signal includes a video signal compatible with an HDR (High Dynamic Range).

17. The driving controlling device according to claim 2, wherein
the circuitry is configured to control, in a case where the luminance of the video signal exceeds 100 $cd/m^2$, the light emission luminance of the LED on a basis of control of the current value of the current for energizing the LED.

18. The driving controlling device according to claim 2, wherein
the circuitry is configured to control, in a case where the luminance of the video signal exceeds 1000 $cd/m^2$, the light emission luminance of the LED on a basis of control of the current value of the current for energizing the LED.

19. A driving controlling device, comprising:
circuitry configured to
control energization time for energizing an LED (Light Emitting Diode) with current to control a light emission luminance of the LED; and
control a current value of the current for energizing the LED, to control the light emission luminance of the LED,
wherein the circuitry is configured to control, in the case where the luminance of the inputted video signal is lower than the predetermined luminance value, the light emission luminance of the LED on a basis of the current value of the current for energizing the LED, with an additional capacitance of the LED taken into consideration.

20. The driving controlling device according to claim 19, wherein the circuitry is configured to control such that, in the case where the luminance of the inputted video signal is lower than the predetermined luminance value, the LED is energized with the current of a current value with which a charging voltage according to the additional capacitance of the LED exceeds a threshold value during the controlled energization time, with the additional capacitance of the LED taken into consideration, to control the light emission luminance of the LED.

* * * * *